(12) United States Patent
Williams et al.

(10) Patent No.: US 6,374,078 B1
(45) Date of Patent: Apr. 16, 2002

(54) WIRELESS COMMUNICATION SYSTEM WITH MULTIPLE EXTERNAL COMMUNICATION LINKS

(75) Inventors: Bill G. Williams, Waco; Jerry W. Petermann, Pflugerville, both of TX (US)

(73) Assignee: Direct Wireless Corporation, Austin, TX (US)

( * ) Notice: Subject to any disclaimer, the term of this patent is extended or adjusted under 35 U.S.C. 154(b) by 0 days.

(21) Appl. No.: 09/583,839

(22) Filed: May 31, 2000

Related U.S. Application Data

(63) Continuation-in-part of application No. 09/062,012, filed on Apr. 17, 1998, now Pat. No. 6,141,531.

(51) Int. Cl.[7] ............................. H04B 3/58; H04Q 7/32
(52) U.S. Cl. ........................... 455/7; 455/554; 455/555; 455/422
(58) Field of Search ................................. 455/422, 554, 455/555, 7; 370/279, 215

(56) References Cited

U.S. PATENT DOCUMENTS

| | | |
|---|---|---|
| 4,790,000 A | 12/1988 | Kinoshita |
| 4,833,701 A | 5/1989 | Comroe et al. |
| 4,955,050 A | 9/1990 | Yamauchi |
| 5,265,150 A | 11/1993 | Helmkamp et al. |
| 5,297,192 A | 3/1994 | Gerszberg |
| 5,400,327 A | 3/1995 | Dezonno |
| 5,442,805 A | 8/1995 | Sagers et al. |
| 5,504,803 A | 4/1996 | Yamada et al. |
| 5,533,027 A | 7/1996 | Akerberg et al. |
| 5,574,775 A | 11/1996 | Miller, II et al. |
| 5,594,777 A | 1/1997 | Makkonen et al. |
| 5,606,560 A | 2/1997 | Malek et al. |
| 5,625,672 A | 4/1997 | Yamada |
| 5,645,949 A | 7/1997 | Young |
| 5,734,699 A | 3/1998 | Lu et al. |

FOREIGN PATENT DOCUMENTS

WO    WO94/05101    3/1994

*Primary Examiner*—Daniel Hunter
*Assistant Examiner*—Alan T. Gantt
(74) *Attorney, Agent, or Firm*—Taylor Russell & Russell, P.C.

(57) ABSTRACT

A decentralized asynchronous wireless communication system is disclosed for providing voice and data communication that allows flexibility of communication paths for local communication or for communication to external networks. The system makes use of handsets that may communicate in a local mode with other handsets within a same microcell via signal extenders. In an extended mode, a handset located in a first microcell of a first macrocell may communicate with a second handset in a second microcell of the first macrocell via signal extenders and a network extender. In a remote mode, a handset located in a first microcell of a first macrocell may communicate with a second handset in a second microcell of a second macrocell via signal extenders and network extenders. The system is particularly suitable for operation in rural areas having a low population density.

40 Claims, 11 Drawing Sheets

WIRELESS COMMUNICATION SYSTEM WITH MULTIPLE EXTERNAL COMMUNICATION LINKS

RELATED APPLICATIONS

This application is a continuation-in-part of U.S. patent application Ser. No. 09/062,012 filed on Apr. 17, 1998 now U.S. Pat. No. 6,141,531.

BACKGROUND

The invention relates generally to a local wireless communication system and, more particularly, to a wireless communication system using radio frequencies for transmitting and receiving voice and data signal with an internal network with multiple internal communication paths, and multiple external communication paths for linking the internal network to an external communication networks.

Wireless communication systems continue to grow, particularly in the areas of cellular and digital telephony and in paging systems. Wireless systems are especially popular in remote areas of the world that have limited wired service because of the cost and difficulty of building a wired infrastructure.

Current traditional wireless communication systems such as cellular telephones use radio communication between a plurality of subscriber units within the synchronous wireless system and between subscriber units and the Public Switched Telephone Network (PSTN) for calls that are outside of the wireless system. Most of these systems are characterized by wireless mobile telephone units communicating synchronously with base stations that are connected to centralized mobile switching centers (MSC), which are in turn connected to the PSTN. The centralized MSC performs a number of functions, including routing wireless mobile units calls to other mobile units and wired (land-line) users and routing land-line calls to mobile units. The MSC accomplishes this by being connected to base stations for accessing mobile users and by being connected to the PSTN for accessing users outside the wireless system, be they other wireless users in other wireless systems or land-line users. Therefore the MSC functions, as its name implies, as a switching and routing center that controls the overall operation of the systems. This results in a centralized calling system with the MSC being involved in routing all the calls to and from the wireless system. This centralization allows the MSC to be the primary collection point for compiling billing information for its wireless mobile units. The centralized MSC also creates a need for expensive infrastructure equipment. As more mobile telephone units are added to the system, the MSC must in turn expand to be able to handle the additional volumes of phone calls, connections and the associated billing services. In addition, since the base stations provide the connection to the mobile units, a large increase in the number of mobile units within an area covered by the base station can overload the base station, thus requiring more base stations and/or enhancing the capabilities of the base stations.

Others systems use point-to-point radio communication where mobile units may communicate with other mobile units in the local area. They send origin and destination address information and make use of squelching circuits to direct the wireless transmission to the correct destination address. Most of these systems do not appear to provide a connection to a PSTN to send and receive calls outside the wireless network. This type of system is decentralized, but because of the decentralization, collecting accurate billing information may be a problem.

However, most wireless systems still require a synchronous centralized system where a wireless base station (fixed or mobile) operates through a centralized switching center for communication within the synchronous wireless network and for communication outside the wireless network, for example to a PSTN. In many cellular and digital wireless systems, base station controllers cover a geographical area and are connected to a mobile services switching center. When a cellular or digital mobile unit places a call, the call is routed synchronously to the base station controller serving the mobile unit's geographical area and the base station controller synchronously connects the unit to the centralized switching center which in turn routes the call to its appropriate destination. As more wireless units come online in a geographical area, base station controllers and switching centers must be added or upgraded.

Another form of wireless system is called a local multipoint distribution service (LDMS). In an LMDS system, a local area or cell that is approximately 4 km in diameter contains fixed base stations, geographically distributed throughout the local area. One or more antennas within the local area receive calls from the fixed base stations and relay the calls to other fixed base stations. In order for the system to work, the fixed base stations must be within the line-of-sight path of at least one of the antenna units. The LDMS does not provide for mobile stations. Calls can only be routed within the local area and not to an external network. The system is essentially a centralized system within a local area. If one station is not within the line of sight of the antenna, it is effectively cut off from communication.

Therefore there is a need for decentralized wireless communication system for voice and data communication that allows for a flexibility of communication paths, provides local communication as well as optional links to external networks, such as public switch telephone networks, satellites and radio emergency networks, does not require a centralized switching center, provides for secure operation, allows for control the operational state of the internal network, provides for emergency notification and provides a way to collect revenue from the system.

SUMMARY

The present invention is directed to a device and method of use that satisfies these needs. It provides a decentralized asynchronous wireless communication system for voice and data communication that allows for a flexibility of communication paths, provides local communication as well as optional links to external networks, such as public switch telephone networks, satellites and radio emergency networks, does not require a synchronous centralized switching center, provides for secure operation, allows for control the operational state of the internal network, provides for emergency notification and provides a way to collect revenue from the system.

The present invention provides a wireless communication system using radio frequencies for asynchronously transmitting and receiving voice and data signals within an internal network with multiple internal communication paths. It also provides for external communication paths for linking the internal network to external communication networks and is suited to operate in isolated remote locations.

The system provides wireless telecommunication services that are similar, from a user's perspective, to the services provided by other technologies, such as cellular and PCS. The system consists of three primary elements: handsets carried by mobile users, signal extenders for relaying handset signals, and network extenders for interconnecting signals. The signal extenders and network extenders comprise the infrastructure equipment that are located at antenna tower sites. Handsets are assigned standard telephone numbers and are capable of placing and accepting calls with telephones in the public-switched system through the network extenders. Calls that are placed between handsets contained within the asynchronous internal network do not require routing through a PSTN. This is in contrast to synchronous cellular/PCS systems that rely on a PSTN backbone. Besides handling regular voice and data, the system also supports a wide variety of telephone features such as caller ID, call waiting, and text messaging.

The system is particularly suitable for operation in rural areas where population density is low and wireless coverage is either not available or not adequately serviced. The system is suitable for operation in the United States using the Broadband PCS spectrum (1850–1975 MHz) that is licensed by the Federal Communications Commission (FCC). The handset incorporates a modular dual-mode capability to extend the wireless service area with a potential variety of standard wireless formats and bands, such as AMPS, D-AMPS, IS-95, IS-136, and GSM1900. This is an important feature because widespread deployment of a new wireless service takes appreciable time, and there are many other wireless standards from which to chose since these new customers may also venture into standard PCS or cellular markets. Besides the US rural market, other applications for present invention include emerging nations, especially those that presently have limited or no telephone service, and those communities or groups that require a standalone wireless communication network that can be quickly and cost-effectively deployed.

A fourth element, known as a Communications Docking bay (ComDoc) provides additional connectivity to the PSTN, if required. The ComDoc is a fixed-base wireless set capable of asynchronously sending and receiving system calls and/or providing connection with a PSTN. This device reduces the load on the network extender PSTN interface and provides a redundant path to a PSTN. The ComDoc also serves as a battery charging station for handsets.

A method having features of the present invention comprises establishing a local communication path for transmitting and receiving signals between local handsets within a same microcell via a signal extender, establishing an extended communication path for transmitting and receiving signals between extended handsets within different microcells positioned within a same macrocell via signal extenders and a network extender, and establishing a distant communication path for transmitting and receiving signals between distant handsets within different microcells positioned within different macrocells via signal extenders and network extenders. The step of establishing a local communication path may comprise transmitting signals from the local handsets to the signal extender, transmitting signals from the signal extender to the local handsets, and receiving signals from the signal extender by the local handsets. The step of establishing an extended communication path may comprise transmitting signals from the extended handsets to the signal extenders, transmitting signals from the signal extenders to the network extender, transmitting signals from the network extender to the signal extenders, transmitting signals from the signal extenders to the extended headsets, and receiving signals from the signal extender by the extended handsets. The step of establishing a distant communication path may comprise transmitting signals from the distant handsets to the signal extenders, transmitting signals from the signal extenders to the network extenders, transmitting signals between the network extenders, transmitting signals from the network extenders to the signal extenders, transmitting signals from the signal extenders to the distant headsets, and receiving signals from the signal extenders by the distant handsets. The step of transmitting signals between the network extenders may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. Half of the signals received by a signal extender in a microcell may be transmitted by handsets in the microcell in a low radio frequency band and half of the signals received by the signal extender in a macrocell may be transmitted by a network extender in the macrocell in a low radio frequency band. Half of the signals transmitted by a signal extender in a microcell may be received by the handsets in the microcell in a high radio frequency band and half of the signals transmitted by the signal extender in a macrocell may be received a network extender in the macrocell in a high radio frequency band. Transmitting signals between a first handset and a second handset may be conducted asynchronously with transmitting signals between other handsets. The step of establishing a local communication path may comprise using two fixed frequencies in a sub-band spectrum for establishing a local voice data channel. The step of establishing an extended communication path may comprise using four fixed frequencies in a sub-band spectrum for establishing an extended voice data channel.

In an alternate embodiment of the invention, a method of operating a wireless communication system for transmitting and receiving voice and data signals comprises establishing a local communication path for transmitting and receiving signals between local handsets within a same microcell, comprising transmitting signals from the local handsets to a signal extender, transmitting signals from the signal extender to the local handsets, and receiving signals from the signal extender by the local handsets, establishing an extended communication path for transmitting and receiving signals between extended handsets within different microcells positioned within a same macrocell comprising transmitting signals from extended handsets to signal extenders, transmitting signals from the signal extenders to a network extender, transmitting signals from the network extender to the signal extenders, transmitting signals from the signal extenders to extended headsets, and receiving signals from the signal extender by the extended handsets, establishing a distant communication path for transmitting and receiving signals between distant handsets within different microcells positioned within different macrocells comprising transmitting signals from distant handsets to signal extenders, transmitting signals from the signal extenders to network extenders, transmitting signals between the network extenders, transmitting signals from the network extenders to the signal extenders, transmitting signals from the signal extenders to the distant headsets, and receiving signals from the signal extender by the distant handsets. The step of transmitting signals between the network extenders may be selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link. The steps of transmitting signals from the handsets to a the signal extenders may be in a low radio frequency band and transmitting signals from the signal extenders to the handsets may be in a high radio frequency band, transmitting signals from the signal extenders to the network extenders may be in a high radio frequency band and transmitting signals from the network extenders to the signal extenders may be in the low radio frequency band, and transmitting signals between the network extenders may on a high data rate system backbone. Half of the signals received by a signal extender in a microcell may be transmitted by handsets in the microcell in a low radio frequency band and half of the signals received by the signal extender in a macrocell may be transmitted by a network extender in the macrocell in a low radio frequency band. Half of the signals transmitted by a signal extender in a microcell may be received by the handsets in the microcell in a high radio frequency band and half of the signals transmitted by the signal extender in a macrocell may be received a network extender in the macrocell in a high radio frequency band. Transmitting signals between a first handset and a second handset may be conducted asynchronously with transmitting signals between other handsets. The steps of transmitting signals may comprise using Frequency Division Multiple Access techniques for determining sub-bands in the high and low radio frequency bands. The steps of transmitting signals may comprise using Gaussian Minimum Shift Keying modulation for producing a radio frequency waveform. Transmitting signals from handsets and transmitting signals to handsets may comprise a primary mode and a secondary mode of operation. The primary mode of operation may comprise a DW wireless frequency protocol. The secondary mode of operation is selected from the group of wireless protocols consisting of AMPS, D-AMPS, IS-95, IS-136, and GSM1900. The method may further comprise controlling an operational state of the wireless communication system by transmitting an operational state command to a network extender. The step of establishing a local communication path may comprise using two fixed frequencies in a sub-band spectrum for establishing a local voice data channel. The step of establishing an extended communication path may comprise using four fixed frequencies in a sub-band spectrum for establishing an extended voice data channel. The transmitting signals may comprise digitizing, buffering and encoding voice frames and transmitting the voice frames in packets at a date rate that is at least twice that required for real-time decoding, whereby transmitting time requires less than half of real time, and the receiving signals may comprise receiving and decoding the voice frame packets at a data rate that is equal to that required for real-time decoding, whereby receiving time requires less than half of real-time. The method may further comprise transmitting and receiving information over a reference channel for providing a handset with time and date information, microcell and macrocell identification code, attention codes, and broadcast text messages. The method may further comprise transmitting and receiving information over a call initiation channel for handling handset initial registration, handset periodic registration, handset authorization and short id assignment, call requests, call frequency assignment, call progress prior to voice and data channel use, and acknowledgement. The method may for comprise transmitting and receiving information over a call maintenance channel for call completion, call request, 911 position report, call handoff frequency, call waiting notification, voice message notification, text message notification, and acknowledgement.

In another alternate embodiment of the present invention, a wireless communication system for transmitting and receiving voice and data signals comprises means for establishing a local communication path for transmitting and receiving signals between local handsets within a same microcell via a signal extender, means for establishing an extended communication path for transmitting and receiving signals between extended handsets within different microcells positioned within a same macrocell via signal extenders and a network extender, and means for establishing a distant communication path for transmitting and receiving signals between distant handsets within different microcells positioned within different macrocells via signal extenders and network extenders. The means for establishing a local communication path for transmitting and receiving signals between local handsets within a same microcell via a signal extender may comprise a first local handset for encoding voice and data frame packets and transmitting these packets as radio frequency signals in a low radio frequency band, a signal extender for receiving, amplifying, and shifting a frequency of local handset signals in the low radio frequency band to a high radio frequency band and transmitting the high radio frequency band signals, a second local handset for receiving signals in the high radio frequency band from the signal extender and decoding the received signals into a voice and data frame packet, the second local handset for encoding voice and data frame packets and transmitting these packets as radio frequency signals in a low radio frequency band, and the first local handset for receiving signals in the high radio frequency band from the signal extender and decoding the received signals into a voice and data frame packet. The means for establishing an extended communication path for transmitting and receiving signals between extended handsets within different microcells positioned within a same macrocell via signal extenders and a network extender may comprise a first extended handset for encoding voice and data frame packets and transmitting these packets as radio frequency signals in a low frequency band, a first signal extender for receiving, amplifying, and shifting a frequency of the first extended handset signals in the low radio frequency band to a high radio frequency band and transmitting the high radio frequency band signals from the first signal extender to the network extender, the network extender for receiving, amplifying, and shifting a frequency of signal extender signals in the high radio frequency band to a low radio frequency band and transmitting the low radio frequency band signals from the network extender to selected signal extenders, the second signal extender for receiving, amplifying, and shifting a frequency of the network extender signals in the low frequency band to a high radio frequency band and transmitting the high radio frequency band signals, a second extended handset for receiving the second signal extender signals in the high radio frequency band and decoding the received signals into a voice and data frame packet, the second extended handset for encoding voice and data frame packets and transmitting these packets as radio frequency signals in a low frequency band, the second signal extender for receiving, amplifying, and shifting a frequency of the second extended handset signals in the low radio frequency band to a high radio frequency band and transmitting the high radio frequency band signals from the second signal extender to the network extender, the first signal extender for receiving, amplifying, and shifting a frequency of the network extender signals in the low frequency band to a high radio frequency band and transmitting the high radio frequency band signals, and the first extended handset for receiving the first signal extender signals in the high radio frequency band and decoding the received signals into a voice and data frame packet. The means for establishing a distant communication path for transmitting and receiving signals between distant handsets within different microcells positioned within different macrocells via signal extenders and network extenders may further comprise a first network extender for receiving, amplifying the first signal extender signals and transmitting the first signal extender signals to a second network extender over a dedicated communication link, and the second network extender for receiving and shifting a frequency of first signal extender signals in the high radio frequency band to a low radio frequency band and transmitting the low radio frequency band signals from the second network extender to the second signal extender. A microcell may comprise a geographical area containing one or more handsets carried by mobile users and a signal extender and a macrocell may comprise a geographical area containing between one and twenty-one microcells, and a network extender. The signal extender may amplify and translate the frequency of wireless signals for relay between handsets and between handsets and a network extender. The network extender is a central hub and switch for establishing calls, managing voice, data, and signaling channels, and interconnecting calls within the system and to external networks. The dedicated communication link may be selected from the group consisting of a Public Switch Telephone Network, a fiber optic communication link, a coaxial cable, a public TCP/IP network, and a satellite communication link. The handsets may comprise a processor for controlling handset operation comprising a digital signal processor, a controller, permanent memory, non-volatile memory, and volatile memory, a user interface comprising a display, a keypad, ringer devices, microphone and speaker, a vocoder connected to a microphone and speaker interface, a power manager and power source, an external data interface, a 911 position locator, a primary mode transceiver having a transmitter and two receivers connected to an omni-directional antenna for use with a DW protocol, and a secondary mode transceiver for providing service using a standard protocol. The handsets may transmit voice and data packets half of the time and receive voice and data packets half of the time when in use. The signal extenders may comprise an omni-directional antenna connected to an omni duplexer for establishing communication paths with handsets, a directional antenna connected to a directional duplexer for establishing communication paths with network extenders, a controller for controlling operation of the signal extender, an uplink translator for shifting a frequency of signals received from handsets from a low radio frequency band to a high radio frequency band for transmission to network extenders, a downlink translator for shifting a frequency of signals received from network extenders from a low radio frequency band to a high radio frequency band for transmission to handsets, a local translator for shifting a frequency of signals received from handsets from a low radio frequency band to a high radio frequency band for transmission to other handsets, and power amplifiers, low noise amplifiers, a control transceiver and an uninterruptible power supply. The network extenders may comprise directional antennas connected to microcell transceiver banks for establishing communication paths with signal extenders Within microcells, microcell servers associated with the microcell transceiver banks for performing control functions associated with each microcell, a global positioning system reference source for stabilizing local oscillators, a central switch for connecting to other macrocells and external communication networks, a central processor for coordinating call activity within the network extender, an Internet interface, public switched telephone network interface and interfaces to other network extenders, and an uninterruptible power supply.

BRIEF DESCRIPTION OF THE DRAWINGS

These and other features, aspects, and advantages of the present invention will become understood with regard to the following description, appended claims, and accompanying drawings where:

DETAILED DESCRIPTION

Figure 1:
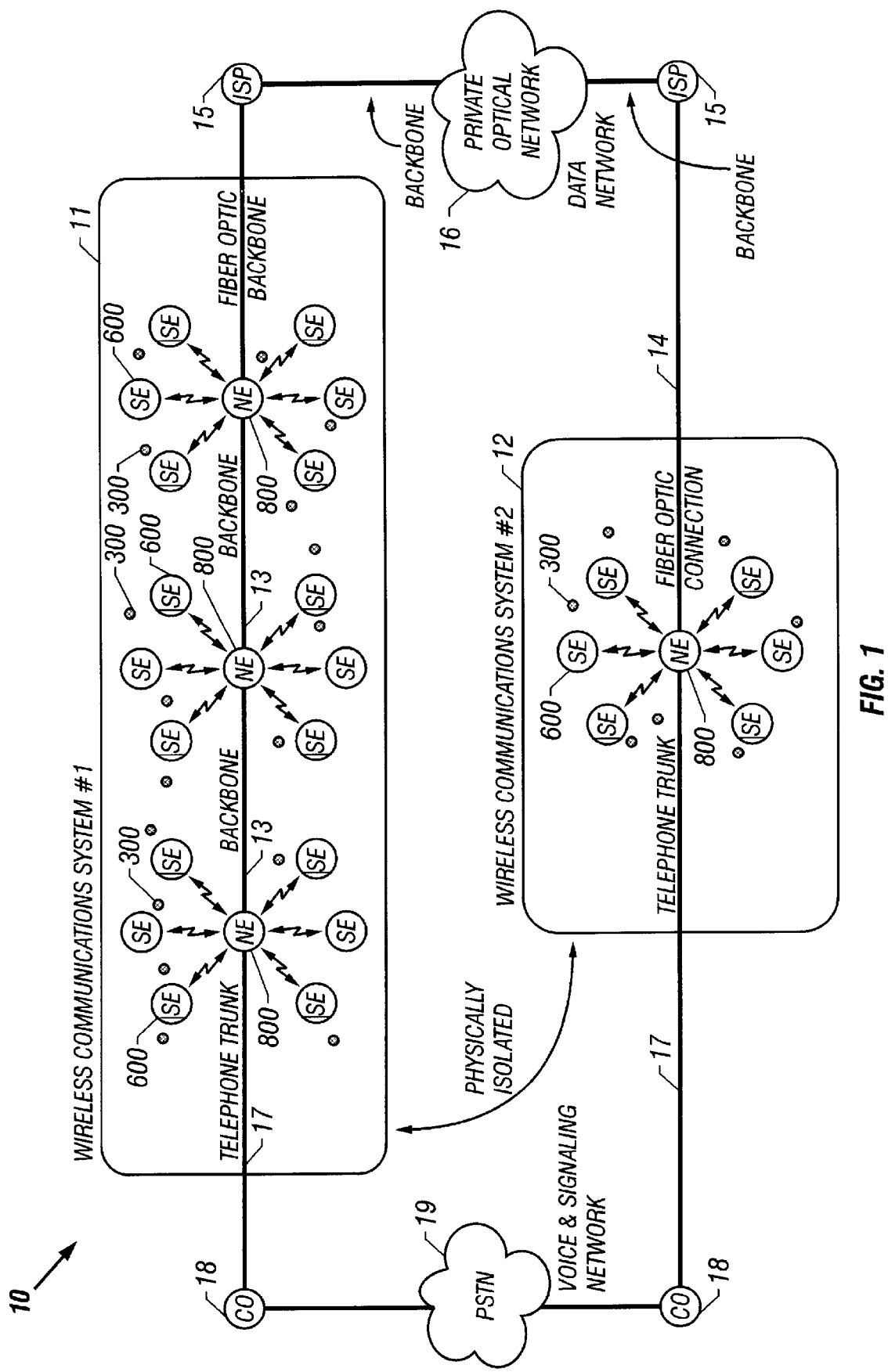
FIG. 1 shows a deployment of two embodiments of the present wireless communication system connected to other communication networks.
Figure 11:
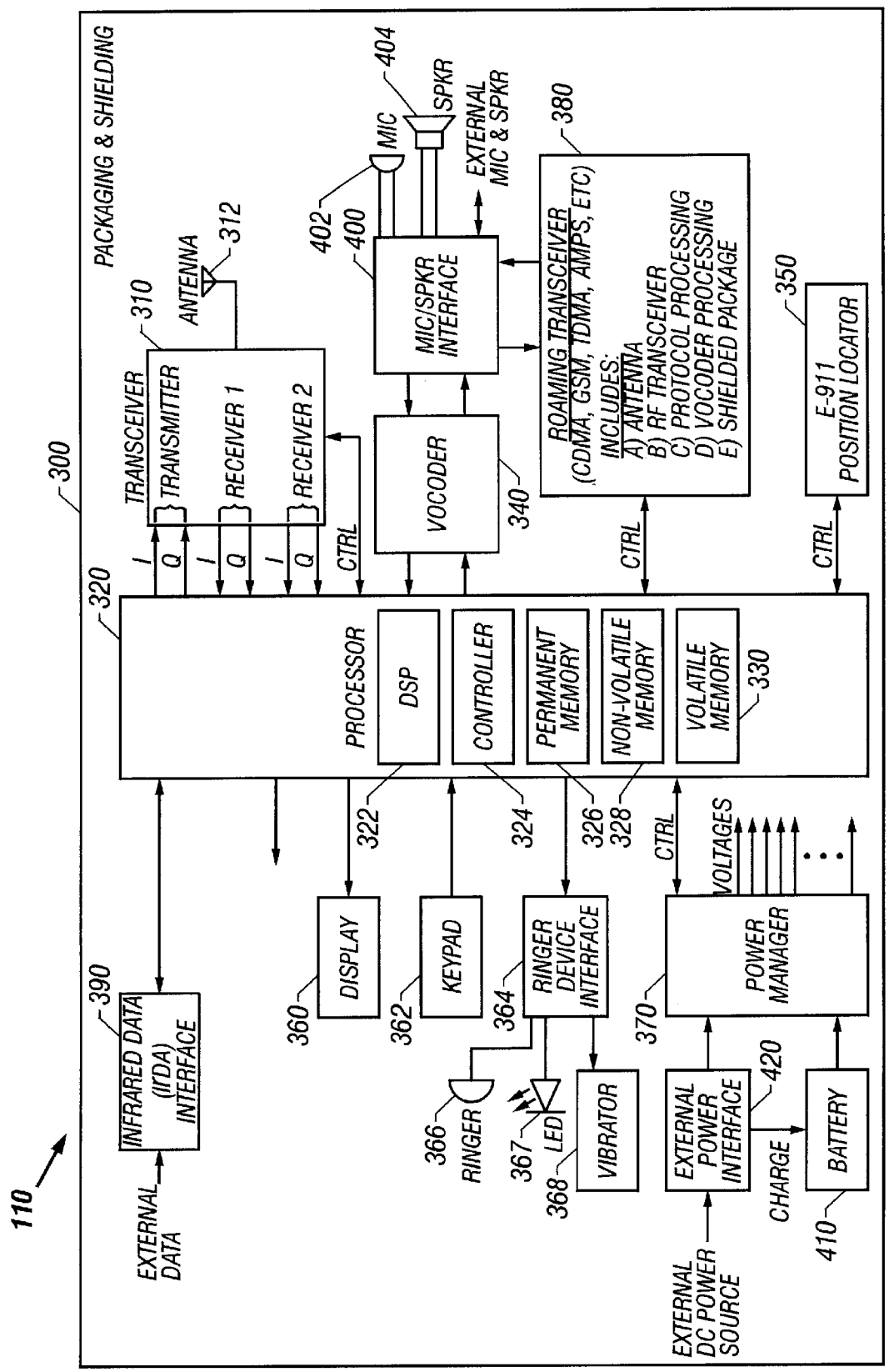
FIG. 11 shows a block diagram of a handset.
Figure 12:
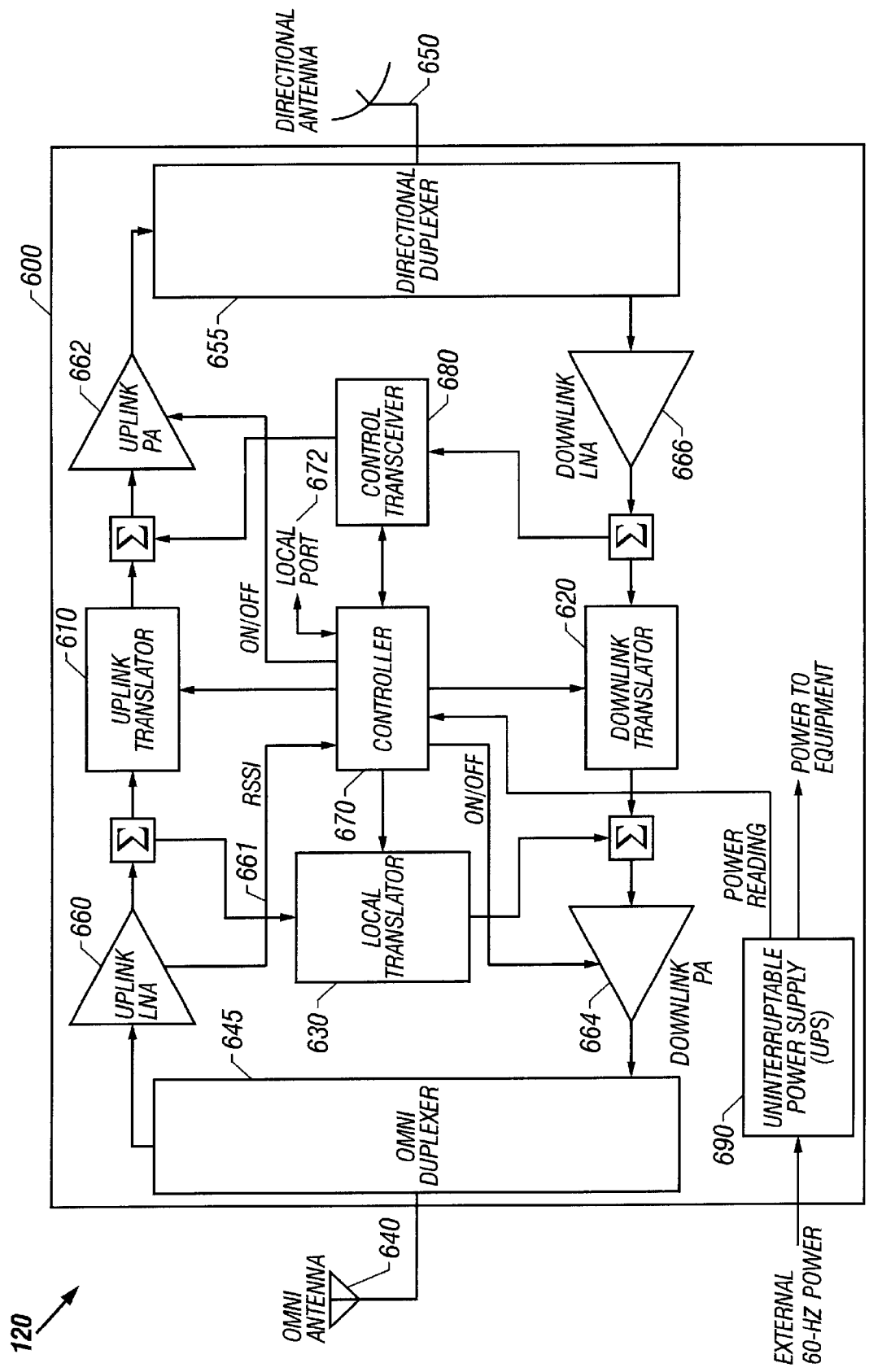
FIG. 12 shows a block diagram of a signal extender.

Turning now to FIG. 1, FIG. 1 shows a deployment 10 of two embodiments 11, 12 of the wireless communication system connected to other communication networks 16, 19, in accordance with the present inventive concepts. The wireless communication systems 11, 12 are primarily composed of fundamental elements th at include handsets 300, signal extenders (SE) 600, and network extenders (NE) 800. The handsets 300 are similar in features and functions to cellular and PCS handsets. They support two mobile wireless protocols: a novel DW protocol (DW mode) described in the present disclosure, and a secondary standard wireless protocol (roaming mode). The present invention includes the DW protocol. The secondary protocol may be selected from several standard alternative protocols. The system infrastructure for the secondary protocol is not addressed in this disclosure. The wireless communication system infrastructure (SEs 600 and NEs 800) and the DW wireless protocol are completely independent of the secondary mode. The signal extender (SE) 600 is a relay that amplifies and translates the frequency of wireless radio frequency (RF) signals between handsets 300 and a Network Extender (NE) 800, or between two handsets 300. In the first case (between handsets 300 and NE 800), the objective is to provide long range with good coverage at low cost relative to existing cellular and PCS systems. In the second case (between two handsets 300), the objective is to provide additional call capacity by reducing the number of signals that are transmitted to the NE 800. The antenna pattern between the SE 600 and handsets 300 is generally omni-directional, since the handsets 300 are typically mobile throughout the surrounding area of the SE 600. In contrast, the antenna pattern between the SE 600 and NE 800 can be a narrow beam since the SE 600 and NE 800 sites are both at fixed locations. The SE 600 is analogous to a simplified "base transceiver station" or BTS in a cellular or PCS system. A key point to simplification is that the SE 600 does not switch, process, or demodulate individual channels or calls. It is limited in function to relaying blocks of RF spectrum. The NE 800 is a central hub and switch for interconnecting calls both within the system and to external networks such as the PSTN. The NE 800 assists handsets 300 in establishing calls, manages the voice/data and signaling channels, and effectively connects calls for SEs 600 that are connected to the NE 800. Since the NE 800 must be in radio line-of-sight with the SEs 600 that it services, its location site may be critical in system deployment. A hardware connection between the SE 600 and the NE 800 may substitute for difficult line-of-site deployments. The NE 800 is analogous to a simplified "mobile switching center" or MSC in a cellular or PCS system. While an MSC may be compared to a telephone CO (central office) 18 or TO (toll office), the NE 800 more closely compares to a PBX (Private Branch Exchange), which connects to a CO 18 or TO. The NE 800 enables the wireless communication systems 11, 12 to function independently of an external network. The wireless communication systems 11, 12 are deployed as networks as shown in FIG. 1. The networks 11, 12 consists of one or more fixed NE 800 sites and a number of fixed SE 600 sites associated with each NE 800. The networks 11, 12 are essentially the infrastructure required to service mobile handsets 300 in a given geographical area. A network that includes multiple NEs 800 must support the exchange of digital voice, signaling, and data between NEs 800 in the network. The networks shown in FIGS. 1, 11, 12 are isolated unless one or more NEs 800 are connected to a PSTN 19 or the Internet 16. With PSTN 19 access, the networks 11, 12 can support calls between isolated networks 11, 12, as well as incoming and outgoing calls with other phones in the PSTN. Internet access via internet service providers (ISP) 15 opens the door to remote system monitor, data entry, and sharing of system databases.

In FIG. 1, the wireless communication system #1, 11 comprises three macrocells, where each macrocell includes a network extender 800 communicating with a number of signal extenders 600 that communicate with a number of handsets 300. The network extenders 800 are connected together by communication backbones 13. Network extenders 800 may also connect to a PSTN 19 via a trunk line 17 to a-central switching office 18. Network extenders 800 may also connect to the Internet via a connection 14 to an Internet service provider 15. Therefore, as shown in FIG. 1, wireless communication systems 11, 12 may be interconnected through the Internet 16 and a PSTN 19.

Figure 2:
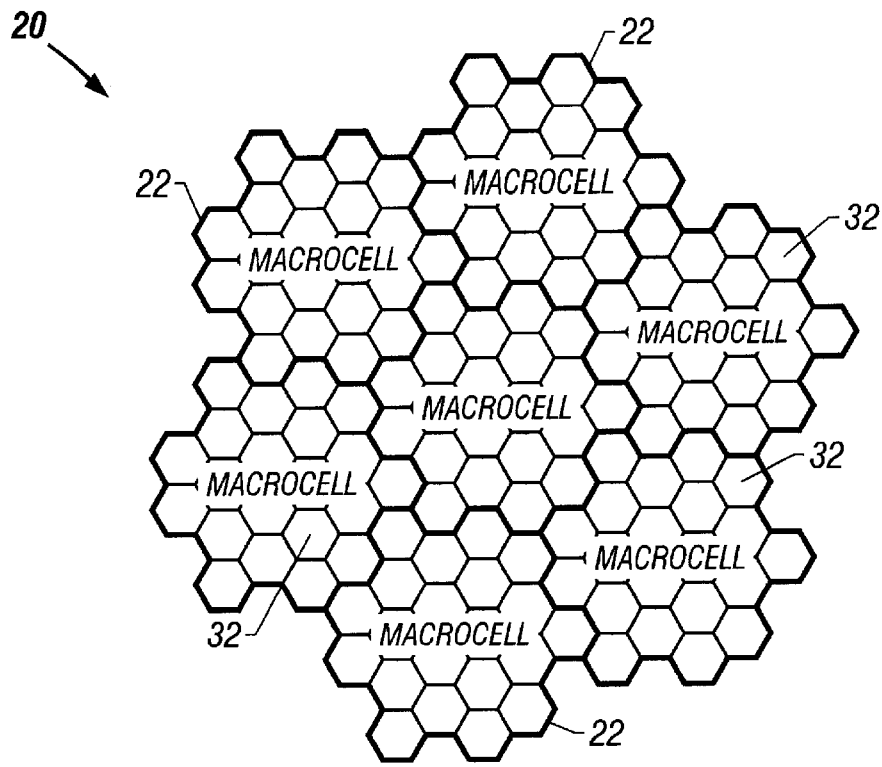
FIG. 2 shows a relationship between adjacent macrocells in a cellular topology.

Turning now to FIG. 2, FIG. 2 shows a relationship between adjacent macrocells 22 in a cellular topology 20. The fixed NE 800 and SE 600 sites of a wireless communication system are organized in a cellular topology 20 similar to the tower arrangement in a cellular or PCS system. The cellular topology 20 promotes frequency reuse and is effective in installation planning. In the present invention, two cell types are defined: microcells 32 and macrocells 22 containing multiple microcells 32. The microcell 32 is the basic building block, and the macrocell 22 is typically a group of 21 microcells 32 as shown in FIG. 2.

Figure 3:
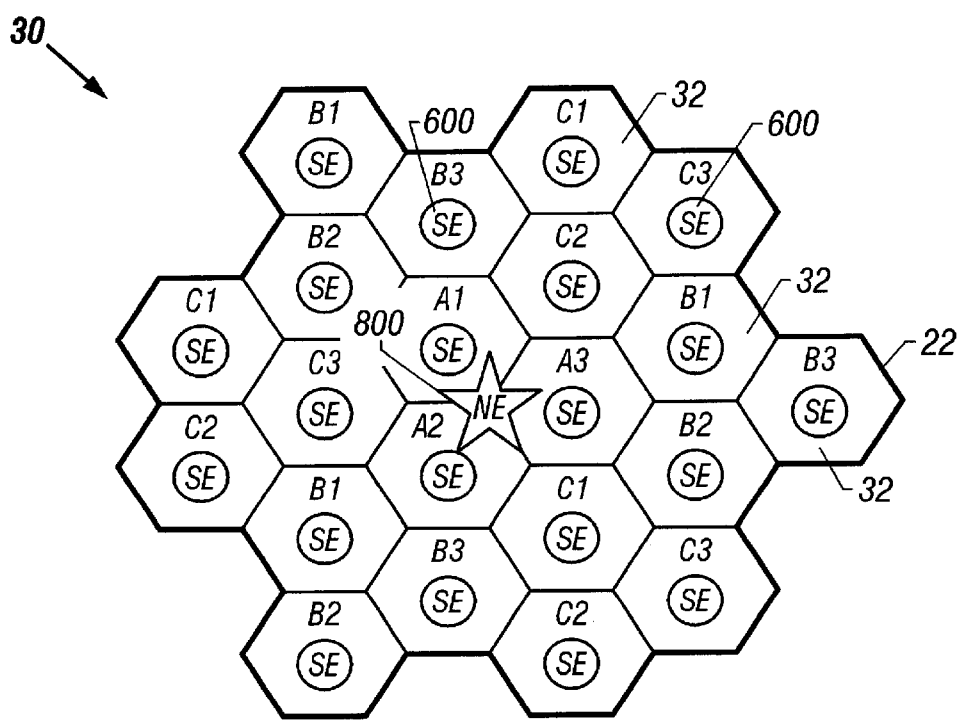
FIG. 3 shows a relationship between adjacent microcells in a macrocell topology.

Turning now to FIG. 3, FIG. 3 shows a relationship between adjacent microcells 32 in a macrocell topology 30. A SE 600 is central to each microcell 32, while an NE 800 is central to each macrocell 22. Nine different microcell types are defined, designated A1-3, B1-3, and C1-3, for the purpose of frequency division multiple access (FDMA). Each microcell type uses a common subset of frequencies. No two microcells 32 of the same type are ever adjacent, even when macrocells 32 are adjacent.

Figure 4:
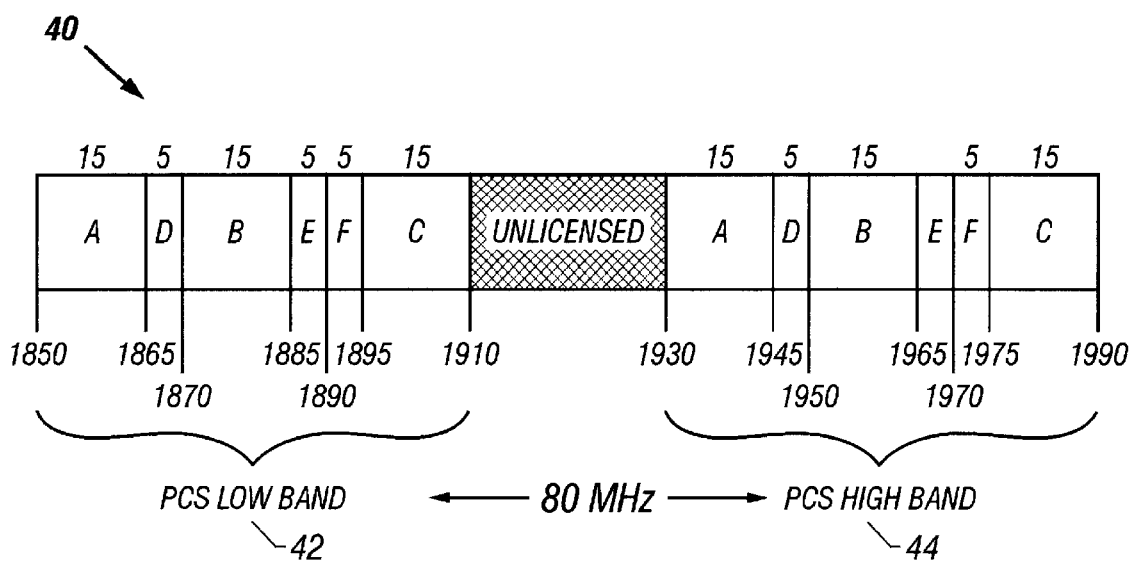
FIG. 4 shows the radio frequency spectrum used by the present wireless communication system.

Turning now to FIG. 4, FIG. 4 shows the radio frequency spectrum 40 used by the present wireless communication system. The present wireless communication system utilizes the Broadband PCS radio frequency spectrum, licensed in the United States by the FCC (Federal Communications Commission). The frequency range that it covers is between 1850 megahertz and 1990 megahertz, and includes PCS low band 42 and PCS high band 44. Licenses must be acquired for one or more PCS blocks, A through F, shown in FIG. 4.

Figure 5:
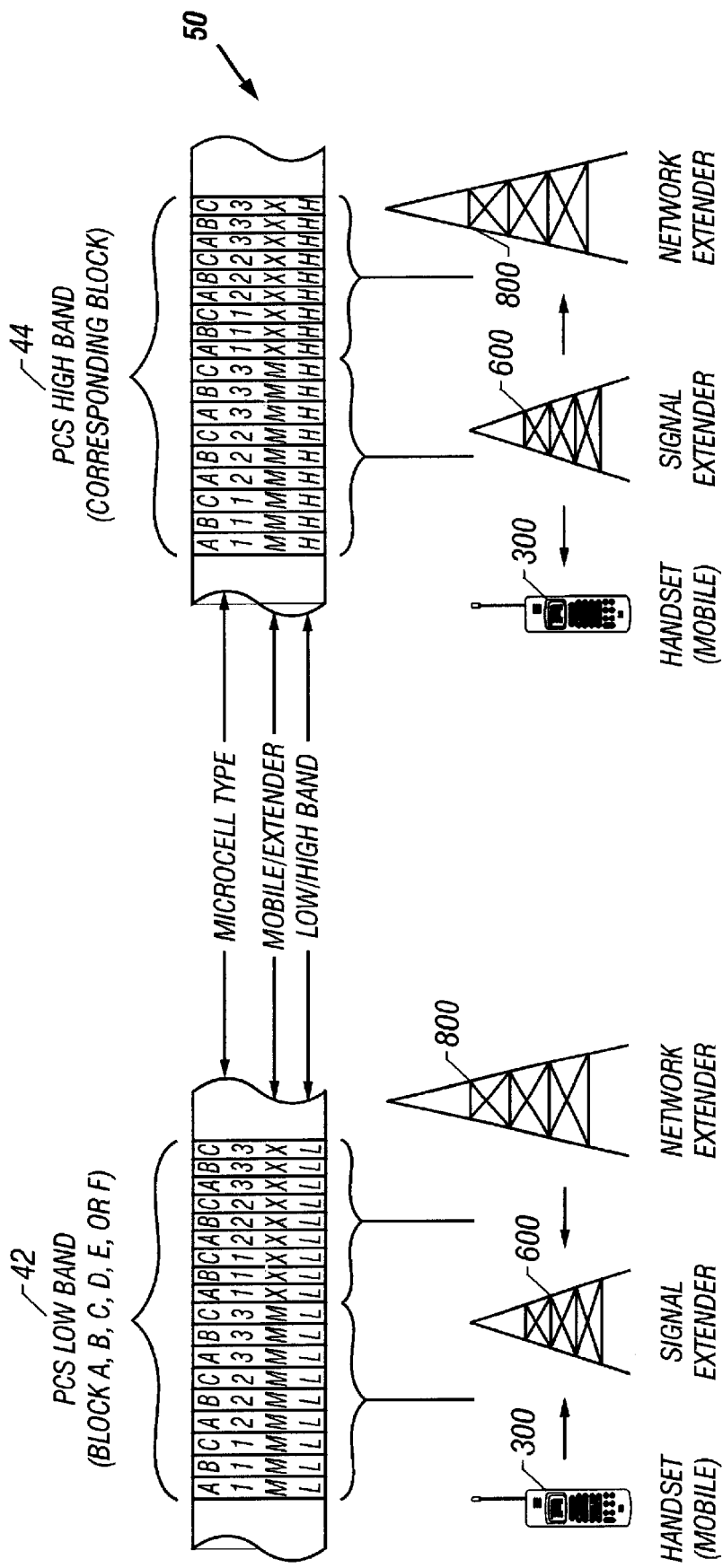
FIG. 5 shows the radio frequency protocol used by the present wireless communication system.

Turning now to FIG. 5, FIG. 5 shows the DW radio frequency protocol 50 used by the present wireless communication system. The DW protocol 50 utilizes the PCS spectrum as illustrated in FIG. 5. The PCS low band 42 is reserved for SE 600 receive frequencies, and the high band 44 for SE 600 transmit frequencies. Half of each band is reserved for signals between the SEs 600 and the handsets 300, with the other half for signals between the SEs 600 and the NE 800. With duplex filtering and 80-MHz separation between the low band 42 and high band 44, the SE 600 can simultaneously receive and transmit signals without compromising receiver sensitivity. This frequency plan allows calls to take place asynchronously, which simplifies the design. Many possible timing architectures were considered for the present wireless communication system. An asynchronous system architecture was selected to provide the best fit to the key requirements of cost, range and user density. Asynchronous operation of the present wireless communication system allows greater flexibility in system geographic layout, simpler digital protocol, and channel separation structure. Conventional digital cellular and PCS systems are designed such that synchronous operation is a necessity. CDMA cellular/PCS systems require synchronous operation to insure demodulation and precise coordination of power control and TDMA cellular/PCS systems require synchronous operation to prevent time slot interference. Synchronous operation allows the system design to make very efficient use of the assigned spectrum (high user density) for a given size geographic area for a trade-offs in system complexity, cost, and flexibility. The present wireless communication system has lower density requirements (rural environment), so the advantages of asynchronous operation became very beneficial to the required cost effectiveness of the present system design. FIG. 5 also shows how the PCS bands are further divided into sub-bands dedicated for each of the 9 microcell types. Each microcell 32 uses the sub-bands assigned for its particular type (alpha-numeric designator A1, A2, A3, B1, B2, B3, C1, C2, or C3) in order to preclude interference with adjacent microcells (since adjacent microcells are never of the same type). The microcell sub-bands are 825 kHz wide for PCS blocks ABC, and 275 kHz wide for blocks DEF. The definition of 9 microcell types provides two additional non-adjacent types beyond the minimum 7 that are required for a hexagonal cell layout with FDMA. For a microcell 32 in the cell pattern illustrated in FIG. 3, the additional two non-adjacent types are the other two alpha designators with the same numeric designator. For example, the sub-bands for microcell types A2 and C2 are not used in the microcells adjacent to microcell B2. Sub-bands A1ML, A2ML, A3ML, B1ML, B2ML, B3ML, C1ML, C2ML and C3ML are assigned to communication from a handset 300 to a signal extender 600. Sub-bands A1MH, A2MH, A3MH, B1MH, B2MH, B3MH, C1MH, C2MH and C3MH are assigned to communication from a signal extender 600 to a handset 300. Sub-bands A1XL, A2XL, A3XL, B1XL, B2XL, B3XL, C1XL, C2XL and C3XL are assigned to communication from a network extender 800 to a signal extender 600. Sub-bands A1XH, A2XH, A3XH, B1XH, B2XH, B3XH, C1XH, C2XH and C3XH are assigned to communication from a signal extender 600 to a network extender 800.

Figure 6:
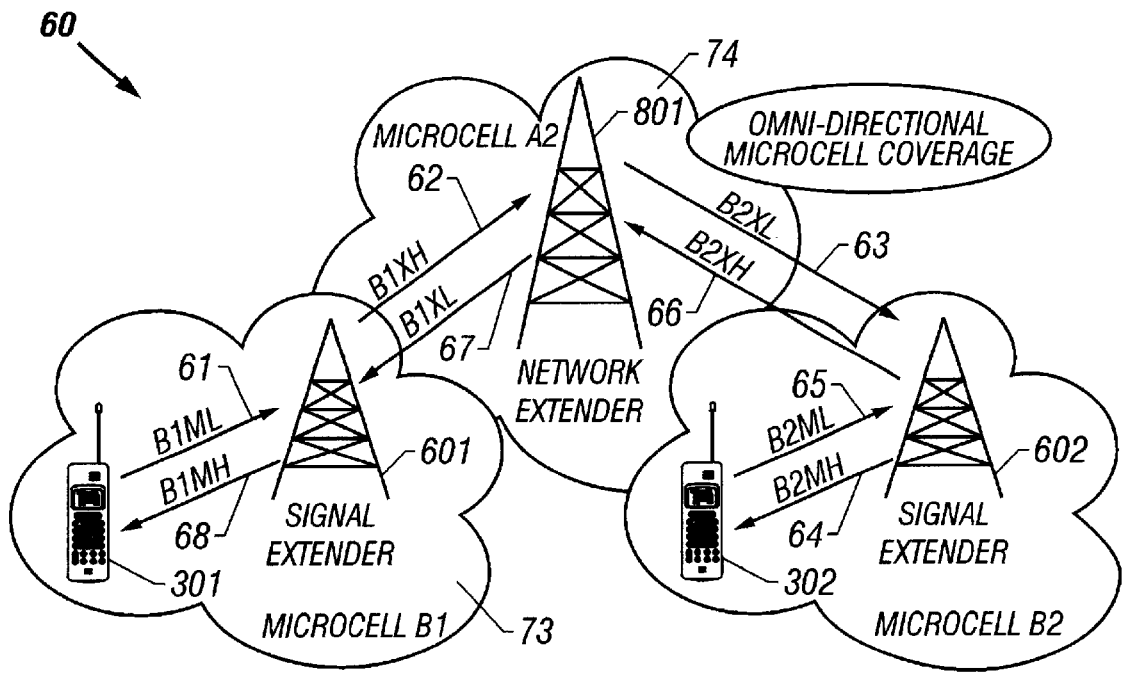
FIG. 6 shows a signal flow diagram of communication paths between handsets in two different microcells.

Turning now to FIG. 6, FIG. 6 shows a signal flow diagram 60 of communication paths 61, 62, 63, 64, 65, 66, 67, 68 between handsets 301, 302 in two different microcells B1, 73 and B2, 75, respectively. The signal flow diagram 60 illustrates an example of frequency usage in the system. In FIG. 6, an extended path call is shown between handsets 301, 302 in two different microcells 73, 75 that are switched at a NE 801 in another microcell A2, 74. The communication from the handset 301 to the signal extender 601 in microcell B1, 73 is omni-directional and is carried on sub-band B1ML 61. The communication from the signal extender 601 to the handset 301 in microcell B13, 73 is omni-directional and is carried on sub-band B1MH 68. The communication from the signal extender 601 in microcell B1, 73 to the network extender 801 in microcell A2, 74 is highly directional and is carried on sub-band B1XH 62. The communication from the network extender 801 in microcell A2, 74 to the signal extender 601 in microcell B1, 73 is highly directional and is carried on sub-band B1XL 67. The communication from the network extender 801 in microcell A2, 74 to the signal extender 602 in microcell B2, 75 is highly directional and is carried on sub-band B2XL 63. The communication from the signal extender 602 in microcell B2, 74 to the network extender 801 in microcell A2, 74 is highly directional and is carried on sub-band B2XH 66. The communication from the signal extender 602 in microcell B2, 75 to the handset 302 in microcell B2, 75 is omni-directional and is carried on sub-band B2MH 64. The communication from the handset 302 in microcell B2, 75 to the signal extender 602 in microcell B2, 75 is omni-directional and is carried on sub-band B2ML 65.

Figure 7:
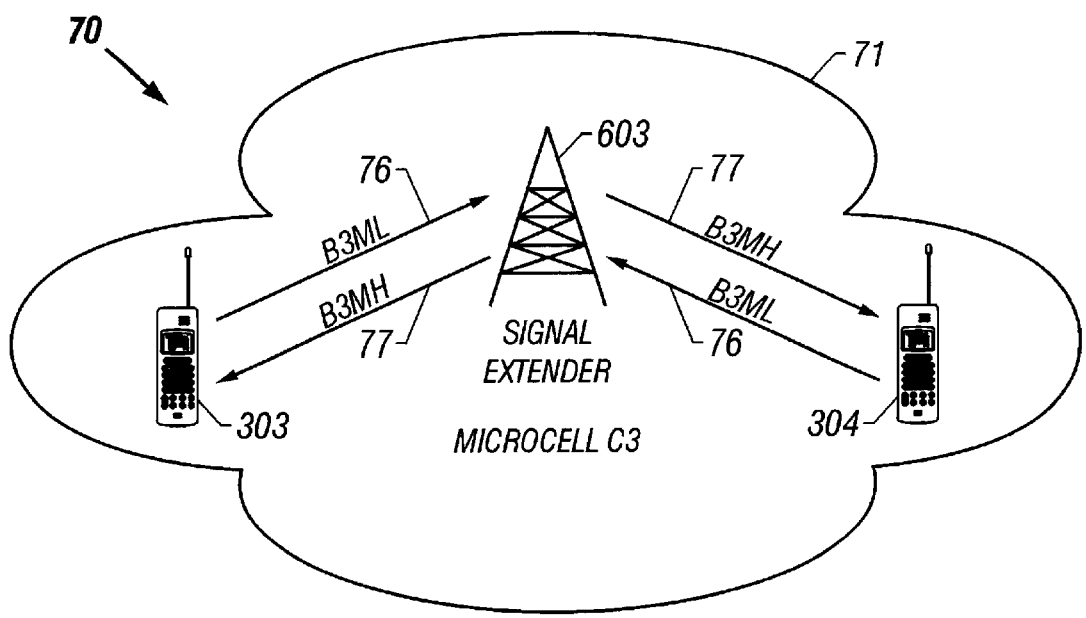
FIG. 7 shows a signal flow diagram of communication paths between handsets within the same microcell.

Turning now to FIG. 7, FIG. 7 shows a signal flow diagram 70 of communication paths 76, 77 between handsets 303, 304 within the same microcell C3, 71. The signal flow diagram 60 illustrates an example of frequency usage in the system. In FIG. 7, a local path call is shown between handsets 303, 304 in the same microcell C3, 71, in which case no central NE switching is required. Note in FIG. 7 that the sub-band used for the local path calls differs from the microcell type, but is usable because it is one of the two non-adjacent microcell types (i.e., different alpha, but same numeric designator). The communication path from the handset 303 to the signal extender 603 is carried on sub-band B3ML 76, and the communication from the signal extender 603 to the handset 303 is carried on sub-band B3MH 77. The communication path from the handset 304 to the signal extender 603 is carried on sub-band B3ML 76, and the communication from the signal extender 603 to the handset 304 is carried on sub-band B3MH 77.

FIGS. 6 and 7 depict the physical relationships between handset 301–304, signal extenders 601–603, network extenders 801, microcells 71, 73–75 and macrocells 74. A macrocell is able to utilize the full amount of PCS spectrum that is licensed. This is achieved by including at least one microcell of each of the 9 types (A1-3, B1-3, C1-3) in a macrocell, as shown in FIG. 3. In addition, spectrum may be reused within a macrocell among non-adjacent microcells and through the use of directional antennas for the SE-to-NE communication links, which are between fixed sites. The radio frequency (RF) waveform is produced using GMSK (Gaussian Minimum Shift Keying) modulation and a data rate of 16 kbps. Baseband filtering limits the 3-dB channel bandwidth to 12.5 kHz. The resultant waveform is a "constant envelope" type, meaning that there is no intended amplitude modulation. The wireless communication system RF coverage and range depend upon the RF parameters of the system (frequency, bandwidth, transmit power, receive sensitivity, antenna gain, etc.), the radio horizon, and the amount of signal occlusion in the line-of-sight between the SE and handset. The RF parameters are specified so that the radio horizon is normally the limiting factor. The radio horizon is a function of the antenna heights and curvature of the earth. As an example, an SE antenna on top of a 100-foot tower can "see" handsets located out to about 14 miles actual ground distance from the base of the tower. Terrain and man-made structures present the potential for signal occlusions, i.e., non-line-of-sight conditions, which reduce effective coverage and range. Urban propagation models for RF signals show a significant decrease in range compared to clear line-of-sight conditions. For example, the RF conditions that yield 253 miles of range when operated with a clear line-of-sight yield only 4 miles with the urban model. The deployment of the wireless communication system in rural areas alleviates the potential for urban occlusions, but terrain is still a factor. Microcell/macrocell layout and SE/NE antenna site selection will be required for each installation based on careful planning, consideration, and test of the propagation conditions and physical constraints of the geographical area. The use of the 1.9-GHz PCS spectrum affects the range, amount of multipath, and signal penetration capability compared to other frequency bands such as VHF and UHF, and therefore must be considered in site layout and planning.

The channelization protocol includes elements of control (signaling) and data (voice/data). The available RF spectrum is broken down into voice/data and signaling channels as shown in Table 1, which shows the number of channels per microcell per PCS block.

TABLE 1

| Channel Type | Function | PCS Block (ABC) | PCS Block (DEF) |
| --- | --- | --- | --- |
| Extended Path | Voice/Data | 63 | 19 |
| Local Path | Voice/Data | 63 | 19 |
| Reference | Signaling | 1 | 1 |
| Call Initiation | Signaling | 1 | 1 |
| Call Maintenance | Signaling | 1 | 1 |

Note that the total number of extended plus local channels may not be available for simultaneous use. A minimum total of 96 channels is required. Channels are comprised of a transmit/receive pair of frequencies separated by 80 MHz. The handset uplink (handset to NE) uses two channel halves, one for handset to SE, and one for SE to NE. Similarly, the handset downlink (NE to handset) uses the other halves of the same two channels, one for NE to SE, and one for SE to handset. The SE provides the necessary frequency translation for both the uplink and downlink. The handset and NE channel pairs are different, but each pair is separated by 80 MHz. The fixed 80-MHz offset is built into the handset and NE transceiver designs to allow for microsecond switching between receive and transmit functions. Local path calls, as shown in FIG. 7, present an exception to the channel concept described in the preceding discussion because these calls do not have an uplink/downlink with the NE. As a result, they use only one channel pair, which is shared between the two handsets. The SE is still required to provide the frequency translation.

Figure 8:
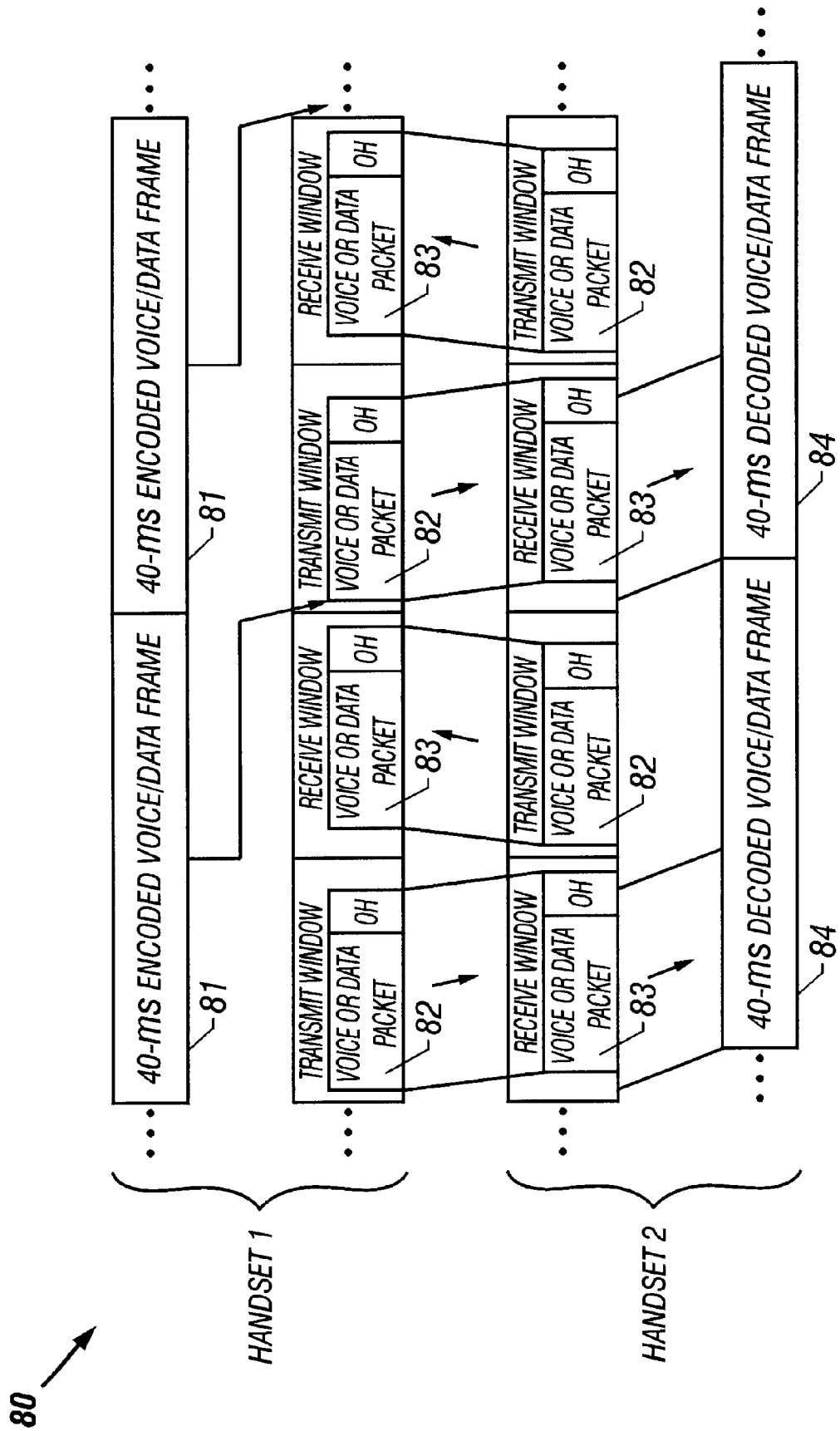
FIG. 8 shows voice frames and packets between two communicating handsets.

Turning now to FIG. 8, FIG. 8 shows voice frames and packets 80 between two communicating handsets. A number of voice data channels (VDCs) are used in each microcell to carry voice/data call traffic in the wireless communication system. Each VDC is dedicated to a single call (i.e., voice/data channels are not multiplexed) to simplify the design. Two VDC types are defined, extended path and local path, as illustrated in FIGS. 6 and 7. Four fixed physical frequencies from the microcell sub-band spectrum are allocated for each extended VDC (i.e., uplink from handsets to SE, uplink from SE to NE, downlink from NE to SE, and downlink from SE to handsets). In contrast, the frequencies for the local VDCs are allocated from the sub-band spectrum of one of the two non-adjacent microcell types, which are identified by different alpha, but same numeric designator. For example, in microcell type B2, the local VDCs use the frequencies from microcell type A2 or C2. Since these cells are non-adjacent, interference is precluded. It is noted that for the local VDC, only two fixed physical frequencies are required (i.e., uplink from handsets to SE, downlink from SE to handsets) since the NE is not utilized. Local VDCs are contained within the microcell, while extended VDCs are connected through the NE to other microcells, macrocells, and/or the PSTN. Calls between handsets located in the same microcell use local VDCs to increase system capacity by reducing the number of calls switched through the NE. The use of separate sub-band blocks for extended and local path/data channels allows the SE to relay the extended VDCs to the NE, and the local VDCs back within the microcell for receipt by other handsets. The number of VDCs in a microcell depends on the amount of spectrum that is available: 38 VDCs (19 local, 19 extended) in a 5-MHz block (D, E, or F) or 96 VDCs (63 max local, 63 max extended) in a 15-MHz block (A, B, or C). One VDC is required for each call in a microcell. Extended VDCs support one handset. Local VDCs support two handsets, but still only one call. The advantage of the local VDC is that the handsets share the channel (which saves a VDC), and the complementary channels for the uplink/downlink are not required (which saves two more VDCs). The result is one channel pair required versus four channel pairs for an extended path call. Whenever one of the handsets on a local VDC call leaves the microcell, the call must be handed off to separate extended VDCs for each handset. The VDC protocol is half-duplex on the physical channel, but is effectively full-duplex from the user's perspective. This is achieved by buffering and encoding the digitized voice data and transmitting it in packets at a higher data rate than is required for realtime decoding. As a result, the handset is able to toggle back and forth between its transmit and receive functions at an even rate (50% transmit, 50% receive). This alternating transmit-receive "ping-pong" approach is illustrated in FIG. 8. An advantage of the ping-pong approach is that full-duplex transmit and receive functionality is not required of the handset. Consequently the handset architecture uses a transmit/receive (TR) switch instead of a duplexer, to significantly reduce cost, size, and weight. A 40 ms voice frame (20 ms transmit window, 20 ms receive window) will be utilized as shown in FIG. 8 based on the vocoder (voice encoder/decoder) packet size. The frame length sets the minimum buffering delay since the voice signal must be fully acquired in realtime and packetized before transmission. Delays due to frame lengths much above 40 ms may become perceptible to the user. On the other hand, short frame lengths much less than 40 ms reduce efficiency and are not desired. Some call maintenance actions require that the handset drop a voice frame. This may be perceptible to the user but will be an infrequent occurrence. This approach allows the handset to use only one transmitter to conserve size, weight, power consumption, and cost. A small amount of in-band signaling data is available on the VDC, for example, DTMF (dual-tone multi-frequency) codes for digits dialed during a call, and call progress codes including hangup indication. This in-band signaling data is shown on FIG. 8, labeled "OH" for overhead data. As shown in FIG. 8, 40 ms encoded voice frames 81 are compressed into a transmit window voice packet 82 and transmitted from handset 1 with overhead data OH. The voice and overhead packets are received as a received window voice packets 83 by handset 2 and decompressed into 40 ms decoded voice frames 84. The reverse of this process is being carried on by handset 2 compressing and transmitting to handset 1 where the voice frame is decompressed and decoded by handset 1.

Figure 9:
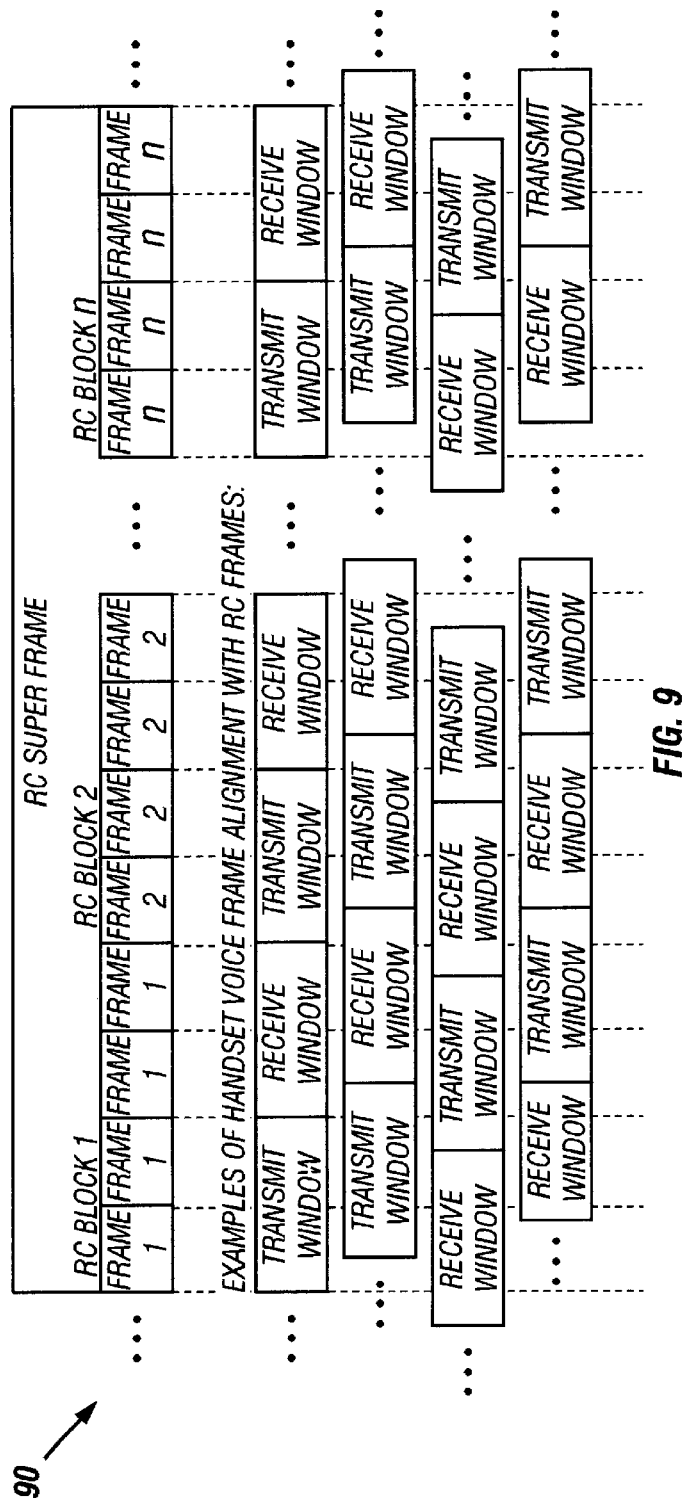
FIG. 9 shows reference channel framing.

Turning now to FIG. 9, FIG. 9 shows reference channel framing. A single, shared Reference Channel (RC) is used in each microcell for broadcast to the handsets. Four fixed physical frequencies from the microcell sub-band spectrum are allocated for the RC (i.e., uplink from handsets to SE, uplink from SE to NE, downlink from NE to SE, and downlink from SE to handsets), although the handset uplink is not utilized. The handsets read the RC to identify the presence of service. Without the RC, the handsets are inoperable. Besides identifying wireless communication system service, the RC is used by the handset to adjust its internal frequency reference (typically a voltage-controlled temperature-compensated crystal oscillator or VCTCXO). This adjustment capability allows the handset to achieve increased frequency accuracy and stability and thus improved bit-error performance in demodulation of signals. The following information is also provided to the handset on the RC:

Date and Time

Microcell/Macrocell Identification Code

Handset Attention Codes (supports the CMC, described below)

Broadcast Text Messages

The NE also transmits special commands on the RC downlink that are addressed to the SE rather than the handsets. These commands are used to remotely enable/disable the SE and assign the microcell type (which sets the frequency sub-blocks for use). Remote control of the microcell type provides system frequency agility. The RC uplink, while not used by the handsets, is used by the SE for command acknowledgement and status reporting to the NE. There are 9 unique RC frequencies in the wireless communication system, one for each microcell type. Handsets continually scan the RCs in order to identify the handset microcell/macrocell location. This is accomplished by monitoring the RC power levels and reading the microcell/macrocell ID codes. Real-time tracking of handset microcell location is important for mobile wireless communication because handoffs are required when handsets move between microcells. In order to facilitate RC scanning while a call is active, the handset architecture includes two parallel receivers; one dedicated to the VDC, and the other dedicated to RC scanning. As shown in FIG. 8, the handset receive function is limited to about 50% duty factor when on a call. The length of the handset receive window is 20 ms based on the vocoder packet size. At the system 16 kbps data rate, 20 ms amounts to 320 bits. In order for the handset to ensure receipt of a complete PC message, the message length must be less than l of the handset receive window, or 10 ms, which amounts to 160 bits. In this case, for design purposes, the RC frame is limited to 150 bits. In order to meet this size limitation, data may be distributed across multiple frames resulting in a superframe. For example, broadcast messages are distributed across a superframe with only a few bytes in each frame. Each RC frame within the superframe is repeated four consecutive times before advancing to the next frame; this is referred to as a block. Each block should be the same length as the 40 ms transmit/receive voice frame. Repeating the RC frame transmission four times ensures that a complete 10-ms RC frame will fall within the 20-ms handset receive window no matter where the receive window begins within the 40-ms block. This process is illustrated in FIG. 9, which shows examples of handset voice frame alignment with RC frames.

Figure 10:
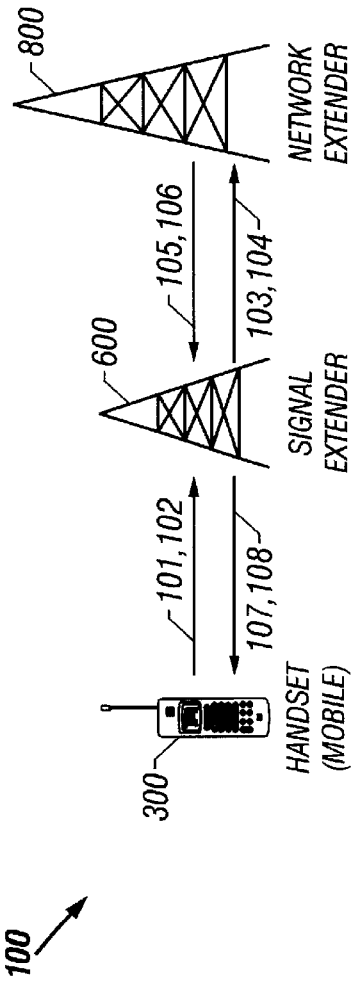
FIG. 10 shows a flow diagram for a call initiation channel and a call maintenance channel.

Turning now to FIG. 10, FIG. 10 shows a flow diagram 100 for a call initiation channel (CIC) 101, 103, 105, 107 and a call maintenance channel (CMC) 102, 104, 106, 108. A single, shared CIC 101, 103, 105, 107 is used in each microcell for handset 300 registration and call establishment. Four fixed physical frequencies from the microcell sub-band spectrum are allocated for the CIC 101, 103, 105, 107. These four frequencies include an uplink 101 from handsets 300 to SE 600, an uplink 103 from SE 600 to NE 800, a downlink 105 from NE 800 to SE 600, and a downlink 107 from SE 600 to handsets 300. The CIC uplink 101 is a random access channel whereby the handsets 300 within a microcell compete for its use. The handsets 300 listen for activity on the CIC downlink 107 from the NE 800 and transmit a call initiation request when the channel is clear. Request messages include the handset address (identification number) and the request information. Response messages include the handset address along with requested information or simple acknowledgement depending on the request. If a downlink response is not received when expected, then the handset will repeat its request following a randomly determined delay period. The delay period is intended to prevent collisions with transmissions from competing handsets on the shared uplink. The following functions are handled on the CIC:

Handset initial registration to NE 800

Handset periodic registration refresh to NE 800

Handset authorization and short id assignment to handset 300

Call request to NE 800 or to handset 300

Call frequency assignment to handset 300

Call progress prior to voice/data channel use to handset 300

Acknowledgements to NE 800 or to handset 300

The handset ID, either an electronic serial number (ESN) or phone number, is 40 bits. When a handset 300 initially registers in a new microcell, it will be assigned an 8-bit temporary ID for use while registered with that microcell. The shorter ID significantly reduces message lengths on the RC, CIC, and CMC where handset addresses are required.

Also shown in FIG. 10, a shared Call Maintenance Channel (CMC) 102, 104, 106, 108 is used in each microcell for out-of-band signaling functions once a call has been established. Four fixed physical frequencies from the microcell sub-band spectrum are allocated for the CMC 102, 104, 106, 108. These include an uplink 102 from handsets 300 to SE 600, an uplink 104 from SE 600 to NE 800, a downlink 106 from NE 800 to SE 600, and a downlink 108 from SE 600 to handsets 300. The CMC uplink 102 is a random access channel whereby the handsets 300 within a microcell compete for its use, just like the CIC uplink. The following functions are handled on the CMC:

Call completion to NE 800

Call handoff request to NE 800

911 position report to NE 800

Call handoff frequency to handset 300

Call waiting notification to handset 300

Voice message notification to handset 300

Text message notification to handset 300

Acknowledgements to NE 800 or to handset 300

When a CMC message is pending for a handset 300, the NE 800 transmits an attention code for the handset on the RC. Since the RC is periodically monitored by the handset 300, even while it is on a call, the handset 300 is able to identify the attention code and then monitor the CMC downlink 108 for the message. When the handset 300 uses the CMC, it drops a 40 ms voice frame in order to use the channel. Consequently, CMC usage must be infrequent and messages should be sized to fit within a single voice frame. If no response is received to a handset request, the request will be retransmitted on another frame after a random delay. Subsequent frames are selected randomly, but the dropping of back-to-back frames is precluded.

Turning now to FIG. 11, FIG. 11 shows a block diagram 110 of a handset 300. The handset 300 includes a transceiver 310 and antenna 320. The transceiver 310 consists of two receivers, one transmitter, and two programmable frequency synthesizers. The antenna 312 may be integrated into the transceiver, or may be a modular type that plugs into the case. The transceiver transmit power is adjustable in 3 dB steps over a 50 dB range relative to the maximum transmit power. The gain of the transceiver antenna 312 is in the range of 0 to 2.5 dBi under controlled conditions. The transceiver 310 is capable of simultaneously receiving and demodulating two signals on independently programmed frequencies. The transceiver architecture includes an 80-MHz offset oscillator to facilitate switching between transmit and receive operations on a single channel pair without needing to re-program a frequency synthesizer. A processor 320 provides centralized control to the handset 300 and includes a digital signal processing (DSP) 322 for demodulating signals, a controller 324 for display/keypad servicing, permanent memory 326, non-volatile memory 328, and volatile memory 330. Firmware is embedded in the processor memory to implement protocols, control the user interfaces for the display, keypad, menus, etc., and control the application program interface (API) for the secondary mode (roaming) protocol. The firmware includes a bootstrap loader that is stored in permanent memory 326 to enable download of the main code. The main code is stored in non-volatile memory 328 so that it is not lost in the absence of power, but can be overwritten by subsequent downloads, e.g., firmware updates. In addition to the main code, there also exist a number of configuration variables that are downloaded to activate the handset 300. These configuration variables set the user's phone number and services subscribed, and are also stored in non-volatile memory. The handset firmware also manages non-volatile user memory for storage of phone book names and numbers, received text messages, and the current operating mode selections (ringer volume/type, beep volume, etc.). The Processor 320 shall have peripheral interfaces to the following elements:

Vocoder 340

E-911 position locator 350

Transceiver 310

Keypad 362

Display 360

Power Manager 370

Roaming Transceiver 380

External Data Interface 390

Miscellaneous controls, including ringer 366, LED 367 and vibrator 368

Permanent memory 326 is utilized for the processor bootstrap firmware and electronic serial number. Each handset 300 contains a unique electronic serial number in permanent memory 326. The serial number permits a minimum of 1 billion unique serial numbers. Bootstrap software is also contained in permanent memory 326 to enable download of the operational software through the handset external data port. The nonvolatile read/write memory 328 is used for storing initialization parameters and phone book data so that battery removal or replacement does not require re-initialization. Each handset contains its phone number in non-volatile memory. The operational software is downloadable to change features or otherwise update the code. The operational software is stored in non-volatile memory 328. The operational software is downloadable using capabilities of the bootstrap software, the external data port 390, and external software. The handset is capable of maintaining user data in non-volatile memory 328, such as phone book entries. The handset includes a vocoder (voice coder/decoder) 340 for processing the digitized voice signals. The vocoder 340 compresses and channel code the digitized voice data in order to meet the voice quality requirement and to enable implementation of the RF and communication protocols. The handset 300 includes a microphone/speaker interface 400 for interfacing a microphone 402 and speaker 404 to other handset components. The handset 300 may accept an external microphone input signal and shall provide an external speaker output signal. The handset 300 includes a power manager 370 to assist in extending battery life. The handset 300 includes a rechargeable battery 410, but is also capable of connection to an external 11–16 Vdc power source through an external power interface 420. The handset 300 includes a roaming transceiver 380 to serve as a secondary or alternate mode to the wireless communication system described The roaming transceiver implements one or more of the following standard wireless protocols:

PCS CDMA (IS-95)

PCS TDMA (IS-136)

GSM 1900

AMPS

The roaming transceiver 380 includes functions for an antenna, RF transceiver, protocol processing, and vocoder processing. The handset 300 also includes provisions for a position locator function to support the enhanced 911 (E911) requirements if needed system level.

Turning now to FIG. 12, FIG. 12 shows a block diagram 120 of a signal extender (SE) 600. The SE 600 serves as a signal relay and frequency-translator between handsets 300 and either a NE 800 or other handsets 300. It receives blocks of data in the PCS low band and up-converts them for re-transmission in the PCS high band, as discussed in relation to FIG. 4 through FIG. 7. In this relay process, the SE 600 amplifies the radio frequency signals to increase system range and coverage. The distinguishing feature of the SE 600 is that it does not switch, process, or demodulate individual channels or signals; it is limited in function to relaying blocks of RF spectrum. This functional simplicity is intended to yield low infrastructure cost. Frequency translation is the primary function of the SE 600. Three such translator functions shall be provided as follows:

| Translator Type | Relay Path |
| --- | --- |
| Uplink | Handset to NE |
| Downlink | NE to Handset |
| Local | Handset to Handset |

Each translator is defined by the center frequency of the input spectrum block, the bandwidth of the block, and an up-conversion offset. The input center frequency is a programmable parameter based on the licensed PCS block (A–F) and the microcell type (A1-3, B1-3, C1-3). The bandwidth and up-conversion offset depend on the PCS block type (ABC or DEF). The three SE translator functions operate with the same bandwidth specifications. The 3-dB bandwidths is fixed at 275 kHz for 5-MHz PCS block types (DEF) or at 825 kHz for 15-MHz PCS block types (ABC). Signals more than 50 kHz from the band edges are rejected by at least 20 dB relative to the band centers. Signals more than 250 kHz from the band edges are rejected by at least 40 dB relative to the band centers. The three SE translator functions operate with the same frequency accuracy specifications. The input center frequency is accurate to within 2 kHz and the up-conversation offset is accurate to within 500 Hz. The uplink translator 610 translates a block of handset signals to the NE 800. The programmable up-conversion offset is 82.5 MHz for 5-MHz PCS block types (DEF) or 87.5 MHz for 15-MHz PCS block types (ABC). The programmable input center frequency is determined according to the following expression:

$$F_{edge} + F_{guard} + \text{Bandwidth}*(\text{Extended}+0.5)$$

where $F_{edge}$, $F_{guard}$, and Bandwidth are given in Table 2, which shows PCS block parameters for SE 600 frequency translators.

TABLE 2

| PCS Block | $F_{edge}$ (MHz) | $F_{mid}$ (MHz) | $F_{guard}$ (MHz) | Bandwidth (MHz) |
| --- | --- | --- | --- | --- |
| A | 1850 | 1857.5 | 0.012500 | 0.825000 |
| B | 1870 | 1877.5 | | |
| C | 1895 | 1902.5 | | |
| D | 1865 | 1867.5 | 0.037500 | 0.275000 |
| E | 1885 | 1887.5 | | |
| F | 1890 | 1892.5 | | |

Table 3 shows the values of extended and local microcell type parameters for SE 600 frequency translators used for the determination of center frequencies.

TABLE 3

| Microcell Type | Extended | Local |
| --- | --- | --- |
| A1 | 0 | 1 |
| B1 | 1 | 2 |
| C1 | 2 | 0 |
| A2 | 3 | 4 |
| B2 | 4 | 5 |
| C2 | 5 | 3 |
| A3 | 6 | 7 |
| B3 | 7 | 8 |
| C3 | 8 | 6 |

The downlink translator 620 translates a block of signals from a NE 800 to the handsets 300. The programmable up-conversion offset is 77.5 MHz for 5-MHz PCS block types (DEF) or 72.5 MHz for 15-MHz PCS block types (ABC). The programmable input center frequency is determined according to the following expression:

$$F_{mid}+F_{guard}+Bandwidth*(Extended+0.5)$$

where $F_{edge}$, $F_{guard}$, and Bandwidth are given in Table 2, and values for Extended are given in Table 3. The local translator 630 translates a block of handset signals to other handsets 300. The up-conversion offset is fixed to 80 MHz. The programmable input center frequency is determined according to the following expression:

$$F_{edge}+F_{guard}+Bandwidth*(Local+0.5)$$

where $F_{edge}$, $F_{guard}$, and Bandwidth are given in Table 2, and the value for Local is given in Table 3. The omni antenna 640 is used for omni-directional SE communication with handsets 300 in a microcell. The antenna gain is between 2 dBi and 6 dBi. The directional antenna 650 is used for directional SE communication with the fixed NE site. The antenna gain is 15 dBi, with a front-to-back ratio greater than 25 dB. Duplexers 645, 655 are used to achieve isolation of the antenna signals between the transmit and receive frequency bands. This is required to allow full duplex, i.e., simultaneous transmit and receive, operation of the SE 600. The duplexers 645, 655 provide transmit-receive (and receive-transmit) isolation of at least 80 dB. An uplink low noise amplifier (LNA) 660 is used to receive the handset signals for the uplink translator 610 and local translator 630. The uplink LNA 660 provides a received signal strength indicator (RSSI) 661 output to the SE controller 670, indicating a measure of the aggregate handset transmission activity in the microcell. An uplink power amplifier (PA) 662 is used to transmit the up-converted handset signals to the NE 800. The uplink PA 662 provides an output level of at least 26 dBm across the entire PCS High band (1930 to 1990 MHz). The uplink PA 662 is able to transmit 66 signals at +4 dBm each simultaneously without damage. The uplink PA 662 also provides means for enabling and disabling the output. A downlink low noise amplifier (LNA) 666 is used to receive NE signals for the Downlink Translator 620. A downlink power amplifier (PA) 664 is used to transmit the up-converted handset signals to a NE 800. The downlink PA 664 provides an output level of at least 48 dBm across the entire PCS High band (1930 to 1990 MHz). The downlink PA 664 is able to transmit 99 signals at +25 dBm each simultaneously without damage. The downlink PA 664 also provides means for enabling and disabling the output. The SE power amplifier gains of the three RF paths (uplink, downlink, local) are independently adjustable in 3 dB steps over a 60 dB range from 37 to 97 dB. The gain adjustments are usually made manually during installation based on the microcell size. A control transceiver 680 is used to receive commands from the NE 800 on the reference channel (RC) downlink, and to transmit acknowledgments and status reports on the RC uplink. The controller 670 is used to program the SE configuration and monitor status for reporting. The controller 670 programs the SE configuration, which consists of the Uplink, Downlink, and Local Translator frequencies, and the Uplink/Downlink PA output on/off state. The following information must be provided to the Controller:

Microcell Type (A1-3, B1-3, C1-3)
PCS Block (A–F)
Desired PA Output State (enabled or disabled)
The SE Translator frequencies are configured based on the microcell type and PCs band as described above. The controller 670 accepts remote commands from the NE 800 via the control transceiver 680 for programming the SE configuration. The controller acknowledges the NE commands. The controller also provides a local port 672 such as an RS-232 for local programming of the configuration in the field from an external laptop computer. Upon power-up, the controller 670 sets the SE configuration to the last configuration programmed. The controller periodically transmits status reports to the NE 800 via the control transceiver 680. The following information is included in the status report:

Microcell type (A1-3, B1-3, C1-3)
PCS band (A–F)
PA output state (on or off)
Uplink LNA RSSI reading
Power draw reading
Power source state (external or battery backup)

An uninterruptible power supply (UPS) 690 is used to power the SE equipment and buffer it from the external power grid. In the event of an external power grid outage, the UPS battery backup capability is able to operate the SE 600 for an extended period of time.

Figure 13A:
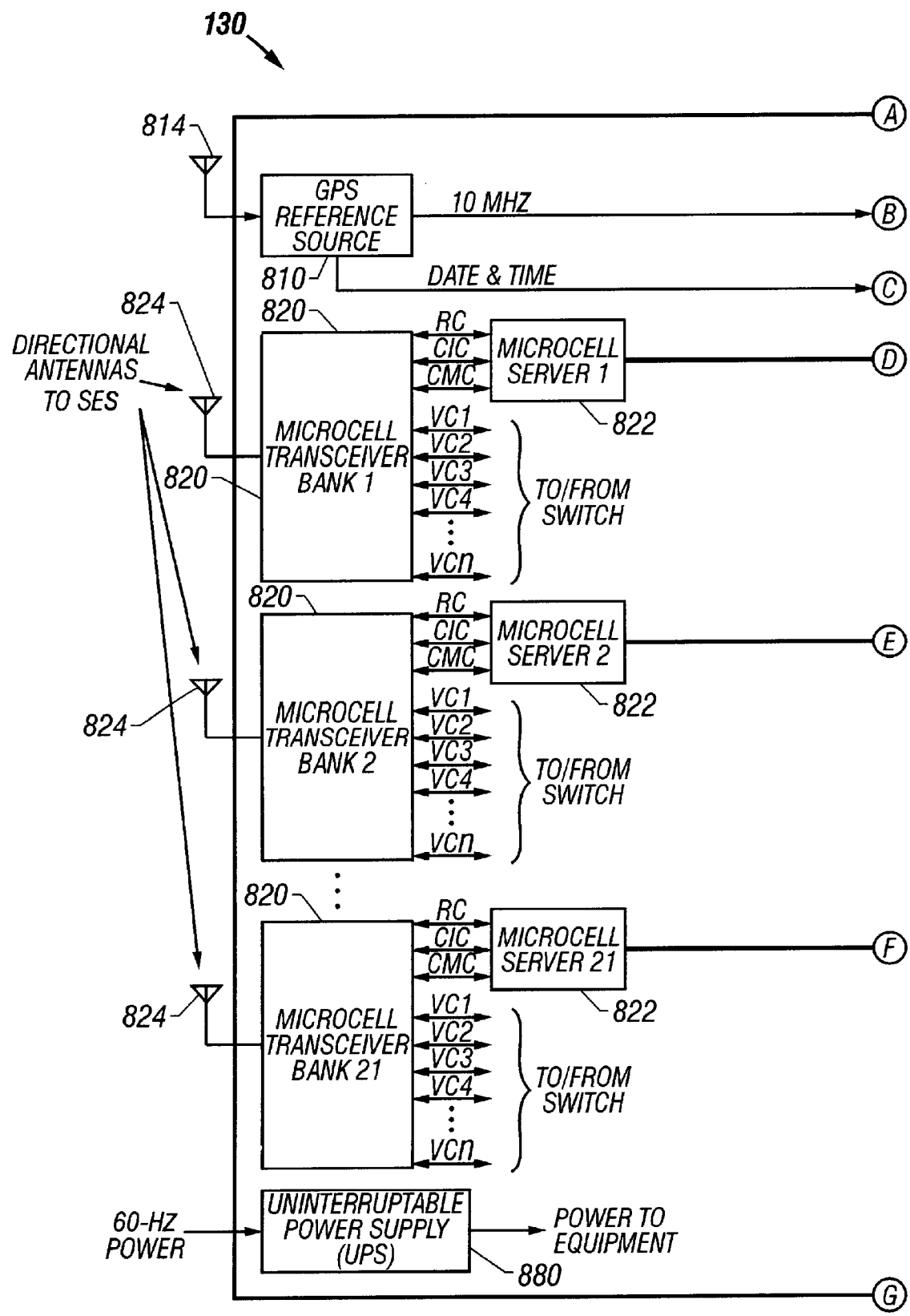
FIG. 13 shows a block diagram of a network extender.
Figure 13B:
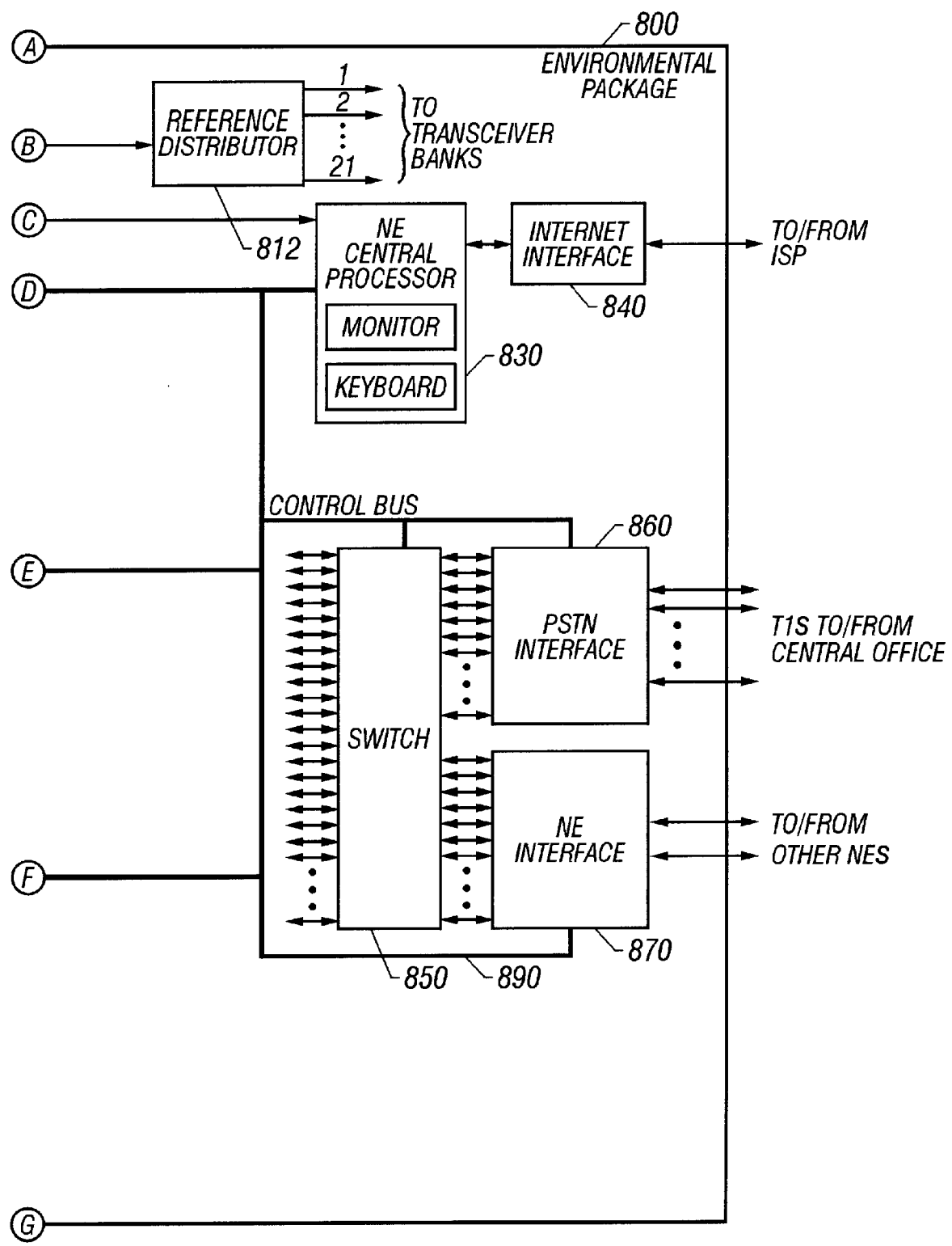

Turning now to FIG. 13, FIG. 13 shows a block diagram 130 of a network extender (NE) 800. The NE 800 is the central switching point for a macrocell, and the external interface to other macrocells, a PSTN and the Internet. The NE 800 incorporates a Global Positioning System (GPS)-based reference source 810 for use in stabilizing the local oscillators in wireless communication system transceivers. The reference output frequency is 10 MHz at the nominal accuracy available from the GPS. The GPS reference source 810 provides a reference frequency used by the NE transceivers and transmitted to the SEs 600 and handsets 300 via the Reference Channel downlink. In addition, the GPS reference source 810 provides date and time information for the macrocell, which is broadcast on the RC downlink. The GPS reference source 810 includes the GPS antenna 814 and a backup reference source suitable to maintain frequency tolerance of RF communication channels. The backup source is automatically selected in the event of GPS signal loss or receiver failure. The reference distributor 812 provides amplification and fan-out, as necessary, to feed the GPS reference signal to the microcell transceiver banks 820. The NE 800 uses directional antennas 824 for communication with the fixed SE sites. The antenna gain is at least 15 dBi with a front-to-back ratio greater than 25 dB. There is one dedicated antenna 824 for each SE 600 supported by the NE 800. Each directional antenna 824 for a microcell is connected to a microcell transceiver bank 820. Each microcell transceiver bank 820 contains a configurable number of transceivers for processing the extended path and signaling channels for the associated microcell. A microcell radio processor is contained within each macrocell receiver bank 820. Microcell servers 822 connect to radios within the microcell transceiver banks 820 to perform control functions associated with a single microcell. The microcell servers 822 communicate with the NE central processor 830 to route and manage calls that connect outside of the microcell. The NE central processor 830 is able to direct the microcell servers 822 to promote a call from local mode to assisted mode, change frequency, or perform a handoff. The microcell servers 822 coordinate control of calls on its microcell, including performing control operations of radios within its microcell transceiver banks 820. The microcell servers 822 accumulate the data for the reference channel and feed it to the radio generating the RC. They also process requests on the CIC and CMC and coordinate the required actions with the radios in its bank and the NE central processor 830. A microcell server 822 may handle multiple transceiver banks. Each microcell server includes an Ethernet interface to connect it to the local area network (LAN) of the NE800. This LAN connection permits the microcell server 822 to communicate with the NE central processor 830 and the radios to perform its control functions. The microcell servers coordinate communication between the NE central processor 830 and the microcell transceiver banks 820 in use. They also monitor non-responsive radios and dynamically remove them from the active use. The microcell servers are also able to relay status/diagnostic information and command shut down of radios not in an active configuration and to report these configuration changes to the NE central processor 830. They also monitor CIC and CMC requests and relay them to the NE central processor 830 and accept messages for the CIC and CMC and relay them to the microcell transceiver banks 820. The NE central processor 830 coordinates call activity within the NE 800. It processes call requests, call terminations, handoff requests, etc., and downloads control information to microcell servers 822 and communicates with the PSTN interface 860. The NE central processor 830 performs call setup, call tear down, call routing, and call handoff, and is responsible for performing authorization and billing. It is externally configurable over the Internet using an Internet interface 840. The NE Central Processor 830 coordinates call activities for the macrocell, and perform authorization, billing, set up, and diagnostic functions. It coordinates calls originating or terminating within the macrocell. Calls may arrive from handsets 300 within the macrocell, handsets 300 within a distant macrocell with a dedicated link to this macrocell, or from a PSTN. This last case includes calls from a PSTN connection over a dedicated NE-NE link, since not every NE may have a PSTN interface. Signaling from these various sources are evaluated and disposition of the call is determined. Calls may be routed in the following ways:

- Within a microcell using the local call mode (no NE handling of voice data)
- Within the macrocell (routed through NE switch w/o decompression)
- To a linked NE 800 (routed through the NE switch to the linked NE w/o decompression)
- To a local PSTN connection (routed through the NE switch to the PSTN gateway with decompression)
- To a PSTN connection on a remote NE 800 (routed between NEs without decompression and then to PTSN with decompression)

Incoming calls are handled in a similar manner. The signaling is routed separately from the voice data. The NE central processor provides source/destination information to the call terminating devices in the system (microcell servers/radios, PSTN gateway, and remote NE central processor/PSTN gateway). It does not perform the routing function per se. For example, if there are two paths between two linked NEs, the NE central processor 830 depends on the switch to route the call appropriately. The software within the NE central processor 830 maintains a database of subscribers. Authorized users are able to add, delete, check status, and modify records associated with handsets using the web page. Specifically, the NE central processor 830 shall perform the functions usually associated with the Authorization Center (AC), Home Location Register (HLR), and Visitor Location Register (VLR) of traditional cellular systems. The NE 800 supports storage and programming of activation data using a secure web interface, which provides a way to program the information needed by the NE 800 to activate a handset 300. The NE central processor monitors outgoing calls, and accumulates a billing record of calls that are outside the calling region (i.e., toll calls). The billing record includes the handset placing the call (i.e., account number), the number called, time of call, duration of call, and total charge for the call. This data is uploadable to a central billing system that is external to the NE 800 over a secure communication link. The NE central processor 830 handles set up information that is in addition to the subscriber records described above. The programmable information includes a unique identifier for the NE 800, numbering information for PSTN links, configuration values for the NE switch 850, PSTN interface 860, and NE-NE links 870. It also includes configuration information for the microcells, including frequency block assignments, SE identifiers, encryption keys, and radio bank configuration (e.g., the number of radios in use for a particular bank). The NE central processor supports diagnostic activities of the NE 800. The Internet interface 840 is the physical hardware that interconnects the NE central processor 830 to an Internet service provider (ISP). The NE 800 contains a mechanism to move (switch) voice/data between different radios, the PSTN, and external NEs. The switch 850 is dynamically reconfigurable to permit calls to be routed automatically to the correct destination. The switch 850 is fast enough to permit calls within a local wireless communication system to operate without perceptible delay. The PSTN interface 860 performs the protocol conversion between the typical PSTN interfaces (T1 or E1) and the internal method used by the NE switch 850. The PSTN interface 860 performs out-of-band signaling using Signaling System 7 (SS7) signaling protocol, such that the NE 800 can act as a central office (CO). The PSTN interface 860 coordinates with the NE central processor 830 to place and receive calls involving the PSTN. The NE interface 870 provides a fixed voice/data communication link for call routing to other NEs in the wireless network. The wireless communication system is configurable to support zero, one, or two external NEs. The NE interface supports three technology types: direct copper connections using DS-1 connections, direct fiber connections using OC-3 links, and radio links with the DS-1 bandwidth. The NE 800 includes a control bus 890 for routing data and control between the central processor 830 and the microcell servers 822, switch 850, NE interface 870, and PSTN interface 860. The control bus maybe a 10/100 Mbit Ethernet LAN (local area network). An uninterruptible power supply (UPS) 880 is used to power the NE equipment and buffer it from the external power grid. In the event of an external power grid outage, the UPS battery backup capability is able to operate the NE for an extended period of time.

Although the present invention has been described in detail with reference to certain preferred embodiments, it should be apparent that modifications and adaptations to those embodiments may occur to persons skilled in the art without departing from the spirit and scope of the present invention as set forth in the following claims.

What is claimed is:

1. A method for operating a wireless communication system for transmitting and receiving voice and data signals, comprising:

a) establishing a local communication path for transmitting and receiving signals between local handsets within a same microcell via a signal extender;

b) establishing an extended communication path for transmitting and receiving signals between extended handsets within different microcells positioned within a same macrocell via signal extenders and a network extender;

c) establishing a distant communication path for transmitting and receiving signals between distant handsets within different microcells positioned within different macrocells via signal extenders and network extenders; and d) asynchronously transmitting and receiving half-duplex signals over the communication paths using pairs of assigned communication path frequencies stabilized by a GPS-based frequency reference source.

2. A method according to claim 1, wherein the step of establishing a local communication path comprises transmitting signals from the local handsets to the signal extender, transmitting signals from the signal extender to the local handsets, and receiving signals from the signal extender by the local handsets.

3. A method according to claim 1, wherein the step of establishing an extended communication path comprises transmitting signals from the extended handsets to the signal extenders, transmitting signals from the signal extenders to the network extender, transmitting signals from the network extender to the signal extenders, transmitting signals from the signal extenders to the extended headsets, and receiving signals from the signal extender by the extended handsets.

4. A method according to claim 1, wherein the step of establishing a distant communication path comprises:
   a) transmitting signals from the distant handsets to the signal extenders;
   b) transmitting signals from the signal extenders to the network extenders;
   c) transmitting signals between the network extenders;
   d) transmitting signals from the network extenders to the signal extenders;
   e) transmitting signals from the signal extenders to the distant headsets; and
   f) receiving signals from the signal extenders by the distant handsets.

5. A method according to claim 4, wherein the step of transmitting signals between the network extenders is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

6. A method according to claim 1, wherein half of the signals received by a signal extender in a microcell are transmitted by handsets in the microcell in a low radio frequency band and half of the signals received by the signal extender in a macrocell are transmitted by a network extender in the macrocell in a low radio frequency band.

7. A method according to claim 1, wherein half of the signals transmitted by a signal extender in a microcell are received by the handsets in the microcell in a high radio frequency band and half of the signals transmitted by the signal extender in a macrocell are received a network extender in the macrocell in a high radio frequency band.

8. A method according to claim 1, wherein transmitting signals between a first handset and a second handset is conducted asynchronously with transmitting signals between other handsets.

9. A method according to claim 1, wherein the step of establishing a local communication path comprises using two fixed frequencies in a sub-band spectrum for establishing a local voice data channel.

10. A method according to claim 1, wherein the step of establishing an extended communication path comprises using four fixed frequencies in a sub-band spectrum for establishing an extended voice data channel.

11. A method of operating a wireless communication system for transmitting and receiving voice and data signals, comprising:
   a) establishing a local communication path for transmitting and receiving signals between local handsets within a same microcell comprising:
      i) transmitting signals from the local handsets to a signal extender;
      ii) transmitting signals from the signal extender to the local handsets; and
      iii) receiving signals from the signal extender by the local handsets;
   b) establishing an extended communication path for transmitting and receiving signals between extended handsets within different microcells positioned within a same macrocell comprising:
      i) transmitting signals from extended handsets to signal extenders;
      ii) transmitting signals from the signal extenders to a network extender;
      iii) transmitting signals from the network extender to the signal extenders;
      iv) transmitting signals from the signal extenders to extended headsets; and
      v) receiving signals from the signal extender by the extended handsets;
   c) establishing a distant communication path for transmitting and receiving signals between distant handsets within different microcells positioned within different macrocells comprising:
      i) transmitting signals from distant handsets to signal extenders;
      ii) transmitting signals from the signal extenders to network extenders;
      iii) transmitting signals between the network extenders;
      iv) transmitting signals from the network extenders to the signal extenders;
      v) transmitting signals from the signal extenders to the distant headsets; and
      vi) receiving signals from the signal extender by the distant handsets; and
   d) asynchronously transmitting and receiving half-duplex signals over the communication paths using pairs of assigned communication path frequencies stabilized by a GPS-based frequency reference source.

12. A method according to claim 11, wherein the step of transmitting signals between the network extenders is selected from the group consisting of transmitting signals over a Public Switch Telephone Network, transmitting signals over a fiber optic communication link, transmitting signals over a coaxial cable, transmitting signals over a public TCP/IP network, and transmitting signals over a satellite communication link.

13. A method according to claim 11, wherein the steps of:
   a) transmitting signals from the handsets to a the signal extenders is in a low radio frequency band and transmitting signals from the signal extenders to the handsets in a high radio frequency band;
   b) transmitting signals from the signal extenders to the network extenders is in a high radio frequency band and transmitting signals from the network extenders to the signal extenders in the low radio frequency band; and
   c) transmitting signals between the network extenders is on a high data rate system backbone.

14. A method according to claim 11, wherein half of the signals received by a signal extender in a microcell are transmitted by handsets in the microcell in a low radio frequency band and half of the signals received by the signal extender in a macrocell are transmitted by a network extender in the macrocell in a low radio frequency band.

15. A method according to claim 11, wherein half of the signals transmitted by a signal extender in a microcell are received by the handsets in the microcell in a high radio frequency band and half of the signals transmitted by the signal extender in a macrocell are received a network extender in the macrocell in a high radio frequency band.

16. A method according to claim 11, wherein transmitting signals between a first handset and a second handset is conducted asynchronously with transmitting signals between other handsets.

17. A method according to claim 11, wherein the steps of transmitting signals comprises using Frequency Division Multiple Access techniques for determining sub-bands in the high and low radio frequency bands.

18. A method according to claim 11, wherein the steps of transmitting signals comprises using Gaussian Minimum Shift Keying modulation for producing a radio frequency waveform.

19. A method according to claim 11, wherein transmitting signals from handsets and transmitting signals to handsets comprise a primary mode and a secondary mode of operation.

20. A method according to claim 19, wherein the primary mode of operation comprises a DW wireless frequency protocol.

21. A method according to claim 19, wherein the secondary mode of operation is selected from the group of wireless protocols consisting of AMPS, D-AMPS, IS-95, IS-136, and GSM1900.

22. A method according to claim 11, further comprising controlling an operational state of the wireless communication system by transmitting an operational state command to a network extender.

23. A method according to claim 11, wherein the step of establishing a local communication path comprises using two fixed frequencies in a sub-band spectrum for establishing a local voice data channel.

24. A method according to claim 11, wherein the step of establishing an extended communication path comprises using four fixed frequencies in a sub-band spectrum for establishing an extended voice data channel.

25. A method according to claim 11, wherein:
a) transmitting signals comprise digitizing, buffering and encoding voice frames and transmitting the voice frames in packets at a date rate that is at least twice that required for real-time decoding, whereby transmitting time requires less than half of real time; and
b) receiving signals comprise receiving and decoding the voice frame packets at a data rate that is equal to that required for real-time decoding, whereby receiving time requires less than half of real-time.

26. A method according to claim 11, further comprising transmitting and receiving information over a reference channel for providing a handset with time and date information, microcell and macrocell identification code, attention codes, and broadcast text messages.

27. A method according to claim 11, further comprising transmitting and receiving information over a call initiation channel for handling handset initial registration, handset periodic registration, handset authorization and short id assignment, call requests, call frequency assignment, call progress prior to voice and data channel use, and acknowledgement.

28. A method according to-claim 11, further comprising transmitting and receiving information over a call maintenance channel for call completion, call request, 911 position report, call handoff frequency, call waiting notification, voice message notification, text message notification, and acknowledgement.

29. A wireless communication system for transmitting and receiving voice and data signals, comprising:
a) means for establishing a local communication path for transmitting and receiving signals between local handsets within a same microcell via a signal extender;
b) means for establishing an extended communication path for transmitting and receiving signals between extended handsets within different microcells positioned within a same macrocell via signal extenders and a network extender;
c) means for establishing a distant communication path for transmitting and receiving signals between distant handsets within different microcells positioned within different macrocells via signal extenders and network extenders; and
d) means for asynchronously transmitting and receiving half-duplex signals over the communication paths using pairs of assigned communication path frequencies stabilized by a GPS-based frequency reference source.

30. A wireless communication system according to claim 29, wherein the means for establishing a local communication path for transmitting and receiving signals between local handsets within a same microcell via a signal extender comprises:
a) a first local handset for encoding voice and data frame packets and transmitting these packets as radio frequency signals in a low radio frequency band;
b) a signal extender for receiving, amplifying, and shifting a frequency of local handset signals in the low radio frequency band to a high radio frequency band and transmitting the high radio frequency band signals;
c) a second local handset for receiving signals in the high radio frequency band from the signal extender and decoding the received signals into a voice and data frame packet;
d) the second local handset for encoding voice and data frame packets and transmitting these packets as radio frequency signals in a low radio frequency band; and
e) the first local handset for receiving signals in the high radio frequency band from the signal extender and decoding the received signals into a voice and data frame packet.

31. A wireless communication system according to claim 29, wherein the means for establishing an extended communication path for transmitting and receiving signals between extended handsets within different microcells positioned within a same macrocell via signal extenders and a network extender comprises:
a) a first extended handset for encoding voice and data frame packets and transmitting these packets as radio frequency signals in a low frequency band;
b) a first signal extender for receiving, amplifying, and shifting a frequency of the first extended handset signals in the low radio frequency band to a high radio frequency band and transmitting the high radio frequency band signals from the first signal extender to the network extender;
c) the network extender for receiving, amplifying, and shifting a frequency of signal extender signals in the high radio frequency band to a low radio frequency band and transmitting the low radio frequency band signals from the network extender to selected signal extenders;

d) the second signal extender for receiving, amplifying, and shifting a frequency of the network extender signals in the low frequency band to a high radio frequency band and transmitting the high radio frequency band signals;

e) a second extended handset for receiving the second signal extender signals in the high radio frequency band and decoding the received signals into a voice and data frame packet;

f) the second extended handset for encoding voice and data frame packets and transmitting these packets as radio frequency signals in a low frequency band;

g) the second signal extender for receiving, amplifying, and shifting a frequency of the second extended handset signals in the low radio frequency band to a high radio frequency band and transmitting the high radio frequency band signals from the second signal extender to the network extender;

h) the first signal extender for receiving, amplifying, and shifting a frequency of the network extender signals in the low frequency band to a high radio frequency band and transmitting the high radio frequency band signals; and i) the first extended handset for receiving the first signal extender signals in the high radio frequency band and decoding the received signals into a voice and data frame packet.

32. A wireless communication system according to claim 31, wherein the means for establishing a distant communication path for transmitting and receiving signals between distant handsets within different microcells positioned within different Miacrocells via signal extenders and network extenders further comprises:

a) a first network extender for receiving, amplifying the first signal extender signals and transmitting the first signal extender signals to a second network extender over a dedicated communication link; and b) the second network extender for receiving and shifting a frequency of first signal extender signals in the high radio frequency band to a low radio frequency band and transmitting the low radio frequency band signals from the second network extender to the second signal extender.

33. A wireless communication system according to claim 29, wherein:

a) a microcell comprises a geographical area containing one or more handsets carried by mobile users and a signal extender; and b) a macrocell comprises a geographical area containing between one and twenty one microcells, and a network extender.

34. A wireless communication system according to claim 33, wherein the signal extender amplifies and translates the frequency of wireless signals for relay between handsets and between handsets and a network extender.

35. A wireless communication system according to claim 33, wherein the network extender is a central hub and switch for establishing calls, managing voice, data, and signaling channels, and interconnecting calls within the system and to external networks.

36. A wireless communication system according to claim 32, wherein the dedicated communication link is selected from the group consisting of a Public Switch Telephone Network, a fiber optic communication link, a coaxial cable, a public TCP/IP network, and a satellite communication link.

37. A wireless communication system according to claim 29, wherein the handsets comprise:

a) a processor for controlling handset operation comprising a digital signal processor, a controller, permanent memory, non-volatile memory, and volatile memory;

b) a user interface comprising a display, a keypad, ringer devices, microphone and speaker;

c) a vocoder connected to a microphone and speaker interface;

d) a power manager and power source;

e) an external data interface;

f) a 911 position locator;

g) a primary mode transceiver having a transmitter and two receivers connected to an omni-directional antenna for use with a DW protocol; and h) a secondary mode transceiver for providing service using a standard protocol.

38. A wireless communication system according to claim 37, wherein the handsets transmit voice and data packets half of the time and receive voice and data packets half of the time when in use.

39. A wireless communication system according to claim 29, wherein the signal extenders comprise:

a) an omni-directional antenna connected to an omni duplexer for establishing communication paths with handsets;

b) a directional antenna connected to a directional duplexer for establishing communication paths with network extenders;

c) a controller for controlling operation of the signal extender;

d) an uplink translator for shifting a frequency of signals received from handsets from a low radio frequency band to a high radio frequency band for transmission to network extenders;

e) a downlink translator for shifting a frequency of signals received from network extenders from a low radio frequency band to a high radio frequency band for transmission to handsets f) a local translator for shifting a frequency of signals received from handsets from a low radio frequency band to a high radio frequency band for transmission to other handsets; and g) power amplifiers, low noise amplifiers, a control transceiver and an uninterruptible power supply.

40. A wireless communication system according to claim 29, wherein the network extenders comprise:

a) directional antennas connected to microcell transceiver banks for establishing communication paths with signal extenders within microcells;

b) microcell servers associated with the microcell transceiver banks for performing control functions associated with each microcell;

c) a global positioning system reference source for stabilizing local oscillators;

d) a central switch for connecting to other macrocells and external communication networks;

e) a central processor for coordinating call activity within the network extender;

f) an Internet interface, public switched telephone network interface and interfaces to other network extenders; and g) an uninterruptible power supply.

* * * * *